US 11,511,188 B2

(12) United States Patent
Wu et al.

(10) Patent No.: US 11,511,188 B2
(45) Date of Patent: Nov. 29, 2022

(54) VIRTUAL SCENE RECOGNITION AND INTERACTION KEY POSITION MATCHING METHOD FOR APPLICATION AND COMPUTING DEVICE

(71) Applicant: Tencent Technology (Shenzhen) Company Limited, Shenzhen (CN)

(72) Inventors: Zhiwen Wu, Shenzhen (CN); Yuanchao Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/085,649

(22) Filed: Oct. 30, 2020

(65) Prior Publication Data

US 2021/0046382 A1 Feb. 18, 2021

Related U.S. Application Data

(63) Continuation of application No. PCT/CN2019/109985, filed on Oct. 8, 2019.

(30) Foreign Application Priority Data

Nov. 9, 2018 (CN) .......................... 201811330926.1

(51) Int. Cl.
*A63F 13/42* (2014.01)
*A63F 13/2145* (2014.01)
(Continued)

(52) U.S. Cl.
CPC .......... *A63F 13/42* (2014.09); *A63F 13/2145* (2014.09); *A63F 13/52* (2014.09); *G06T 15/005* (2013.01)

(58) Field of Classification Search
CPC ...... A63F 13/50; A63F 13/52; A63F 2300/66; A63F 13/42
See application file for complete search history.

(56) References Cited

U.S. PATENT DOCUMENTS 9,751,005 B1 * 9/2017 Dong .................. A63F 13/5378
10,062,181 B1 8/2018 Longhurst et al.
(Continued)

FOREIGN PATENT DOCUMENTS

CN 102662466 A 9/2012
CN 102707937 A 10/2012
(Continued)

OTHER PUBLICATIONS

Tencent Technology, ISR, PCT/CN2019/109985, dated Jan. 6, 2020, 2 pgs.
(Continued)

*Primary Examiner* — Chase E Leichliter
(74) *Attorney, Agent, or Firm* — Morgan, Lewis & Bockius LLP

(57) ABSTRACT

Embodiments of this application provide a virtual scene recognition and interaction key position matching method for an application performed at a computing device. The computing device starts an application in a virtual operating system and performs rendering process on a to-be-presented virtual scene of the application, to obtain rendering data used for rendering the virtual scene. When the rendering data includes a preset map picture, the computing device invokes a corresponding key position configuration file and performs matching process between the preset map picture and a corresponding physical key of the computing device. Next, the computing device presents the virtual scene and key configuration information corresponding to the virtual scene on a display screen of the computing device, the key
(Continued)

configuration information being associated with the matched physical key.

20 Claims, 15 Drawing Sheets

(51) Int. Cl.
    *A63F 13/52*     (2014.01)
    *G06T 15/00*     (2011.01)

(56) References Cited

U.S. PATENT DOCUMENTS

| | | | | |
|---|---|---|---|---|
| 2007/0037625 | A1* | 2/2007 | Edwards | A63F 13/10 |
| | | | | 463/42 |
| 2009/0054140 | A1* | 2/2009 | Beser | A63F 13/61 |
| | | | | 463/31 |
| 2011/0271018 | A1* | 11/2011 | Ye | A63F 13/235 |
| | | | | 710/62 |
| 2011/0314093 | A1* | 12/2011 | Sheu | G06F 3/14 |
| | | | | 709/203 |
| 2012/0086630 | A1* | 4/2012 | Zhu | A63F 13/2145 |
| | | | | 345/156 |
| 2014/0143676 | A1* | 5/2014 | Tan | G06F 9/451 |
| | | | | 715/744 |
| 2016/0054807 | A1* | 2/2016 | Flagg | G06F 3/0346 |
| | | | | 345/158 |
| 2016/0253067 | A1* | 9/2016 | Webb | A63F 13/00 |
| | | | | 463/31 |
| 2018/0311574 | A1* | 11/2018 | Kawahara | G06F 3/04883 |
| 2019/0308104 | A1* | 10/2019 | Nicolades | A63F 13/358 |
| 2021/0046382 | A1* | 2/2021 | Wu | A63F 13/42 |
| 2021/0077904 | A1* | 3/2021 | Yen | A63F 13/335 |

FOREIGN PATENT DOCUMENTS

| | | |
|---|---|---|
| CN | 102799359 A | 11/2012 |
| CN | 103823673 A | 5/2014 |
| CN | 106909547 A | 6/2017 |
| CN | 107297073 A | 10/2017 |
| CN | 107789830 A | 3/2018 |
| CN | 109544663 A | 3/2019 |
| KR | 20130019530 A | 2/2013 |
| KR | 20180111397 A | 10/2018 |

OTHER PUBLICATIONS

Extended European Search Report, EP19881725.6, dated Dec. 3, 2021, 11 pgs.

Tencent Technology, WO, PCT/CN2019/109985, dated Jan. 6, 2020, 5 pgs.

Tencent Technology, IPRP, PCT/CN2019/109985, dated May 11, 2021, 6 pgs.

\* cited by examiner

VIRTUAL SCENE RECOGNITION AND INTERACTION KEY POSITION MATCHING METHOD FOR APPLICATION AND COMPUTING DEVICE

CROSS REFERENCE TO RELATED APPLICATIONS

This application is a continuation application of PCT Patent Application No. PCT/CN2019/109985, entitled "VIRTUAL SCENE RECOGNITION AND INTERACTION KEY POSITION MATCHING METHOD FOR APPLICATION PROGRAM, AND COMPUTING DEVICE" filed on Oct. 8, 2019, which claims priority to Chinese Patent Application No. 201811330926.1, filed with the State Intellectual Property Office of the People's Republic of China on Nov. 9, 2018, and entitled "VIRTUAL SCENE RECOGNITION AND INTERACTION KEY POSITION MATCHING METHOD AND APPARATUS FOR APPLICATION", all of which are incorporated herein by reference in their entirety.

FIELD OF THE TECHNOLOGY

This application relates to the field of Internet technologies, and in particular, to a virtual scene recognition and interaction key position matching method for an application and a computing device.

BACKGROUND OF THE DISCLOSURE

With the development of game technologies, game developers develop a lot of games running on a mobile phone, for example, a mobile game for the Android operating system and a mobile game for the iOS operating system. Because a game player usually operates a mobile game through a touchscreen, the mobile game is usually designed to support only a touch operation and does not support mouse and keyboard operations. However, on one hand, due to a limited size of a screen of a mobile phone, it is difficult to have a relatively good visual experience and visual effect on the mobile phone. On the other hand, on the mobile phone, it is difficult to perform a lot of relatively complex operations on the mobile game by touching the screen. Therefore, to achieve better visual experience, a better visual effect, and to perform a more complex operation on the mobile game, sometimes, a game player expects to play a mobile game on a personal computer (PC) of the game player, and operate the mobile game by using a mouse and a keyboard.

In this case, the mobile game supporting a touch operation needs to be converted into a computer game supporting mouse and keyboard operations. Currently, a PC simulator on the market implements such a conversion function by using a mouse and a keyboard simulating a touch operation. In the PC simulator, a game player needs to set a game operation key before a game or during a game, and then can operate a mobile game by using the game operation key. However, because the mobile game tends to be more complex, and the operation manner also becomes more complex, the game player may need to set a large quantity of game operation keys manually. Because a manner of manually setting the game operation key lacks intelligence, such a key setting and game operation manner in the PC simulator can no longer meet requirements for game operation experience when the game player plays the mobile game.

SUMMARY

Embodiments of this application provide a virtual scene recognition and interaction key position matching method and apparatus for an application, a computer storage medium, and a computing device.

According to the embodiments of this application, the virtual scene recognition and interaction key position matching method for an application is performed at a computing device capable of constructing or running a virtual operating system and includes:

starting an application in the virtual operating system;

performing rendering process on a to-be-presented virtual scene of the application, to obtain rendering data used for rendering the virtual scene;

in accordance with a determination that the rendering data comprises a preset map picture, invoking a corresponding key position configuration file and performing matching process between the preset map picture and a corresponding physical key of the computing device according to the key position configuration file; and presenting the virtual scene and key configuration information corresponding to the virtual scene on a display screen of the computing device, the key configuration information being associated with the matched physical key.

According to the embodiments of this application, the virtual scene recognition and interaction key position matching apparatus for an application is performed at a computing device capable of constructing or running a virtual operating system and includes:

a starting module, configured to start an application in the virtual operating system;

a rendering detection module, configured to perform rendering processing on a to-be-presented virtual scene of the application, to obtain rendering data used for rendering the virtual scene;

a map picture recognition module, configured to recognize whether the rendering data obtained by the rendering detection module includes a preset map picture;

a key position setting module, configured to, when the rendering data comprises a preset map picture, invoke a corresponding key position configuration file and perform matching process between the preset map picture and a corresponding physical key of the computing device according to the key position configuration file; and a display module, configured to present the virtual scene and key configuration information corresponding to the virtual scene on a display screen of the computing device, the key configuration information being associated with the matched physical key.

According to the embodiments of this application, a non-transitory computer-readable storage medium stores a plurality of instructions, the instructions being adapted to be loaded by a processor, to perform the following operations:

starting an application in the virtual operating system;

performing rendering process on a to-be-presented virtual scene of the application, to obtain rendering data used for rendering the virtual scene;

in accordance with a determination that the rendering data comprises a preset map picture, invoking a corresponding key position configuration file and performing matching process between the preset map picture and a corresponding physical key of the computing device according to the key position configuration file; and presenting the virtual scene and key configuration information corresponding to the virtual scene on a display screen of the computing device, the key configuration information being associated with the matched physical key.

According to the embodiments of this application, the computing device is capable of constructing or running a virtual operating system and includes: a processor and a memory, the memory storing computer-readable instructions, and the computer-readable instructions being executed by the processor to perform the following operations:

starting an application in the virtual operating system;

performing rendering process on a to-be-presented virtual scene of the application, to obtain rendering data used for rendering the virtual scene;

in accordance with a determination that the rendering data comprises a preset map picture, invoking a corresponding key position configuration file and performing matching process between the preset map picture and a corresponding physical key of the computing device according to the key position configuration file; and presenting the virtual scene and key configuration information corresponding to the virtual scene on a display screen of the computing device, the key configuration information being associated with the matched physical key.

In the embodiments of this application, an application is started in a virtual operating system, rendering processing is performed on a to-be-presented virtual scene of the application, to obtain rendering data used for rendering the virtual scene, a preset map picture in the rendering data is recognized, a corresponding key position configuration file is invoked when it is recognized that the rendering data includes a preset map picture, to complete matching processing between the map picture and a corresponding physical key of the computing device, and the virtual scene and key configuration information corresponding to the virtual scene are presented on a screen of the computing device. According to the embodiments of this application, a game scene can be quickly and efficiently recognized based on recognition of a map picture in a mobile game application, and game operation keys are automatically and properly distributed in the recognized game scene dynamically in real time, so that the game operation keys are intelligently set. A game player can conveniently use a mouse and a keyboard to experience the game without setting a large quantity of game operation keys, so that the game player can have relatively good game operation experience.

Therefore, the key setting manner based on game scene recognition is relatively intelligent and has a better effect.

BRIEF DESCRIPTION OF THE DRAWINGS

To describe technical solutions in the embodiments of this application more clearly, the following briefly describes the accompanying drawings required for describing the embodiments.

DESCRIPTION OF EMBODIMENTS

The following further describes this application with reference to the accompanying drawings of the specification and specific embodiments. It is to be understood that the specific embodiments described herein are only used for describing this application, instead of limiting this application.

Embodiments of this application provide a virtual scene recognition and interaction key position matching method and apparatus for an application, performed at a computing device capable of constructing or running a virtual operating system, and the virtual operating system is configured to run the application. In a possible implementation, the application may be a mobile game application installed on the computing device. This is not specifically limited in the embodiments of this application.

According to the virtual scene recognition and interaction key position matching method for an application in the embodiments of this application, in a process in which a mobile game application runs on the computing device, a game scene can be quickly and efficiently recognized based on recognition of a map picture in the mobile game application, and game operation keys are automatically and properly distributed in the recognized game scene dynamically in real time, so that the game operation keys are intelligently set. A game player does not need to set the game operation key in the game scene, and only needs to operate a corresponding physical key on a keyboard and a mouse according to the game operation key automatically set by the computing device to operate a mobile game. The key setting manner based on game scene recognition can enable the game player to have relatively good game operation experience, is relatively intelligent, and has a better effect.

Figure 1:
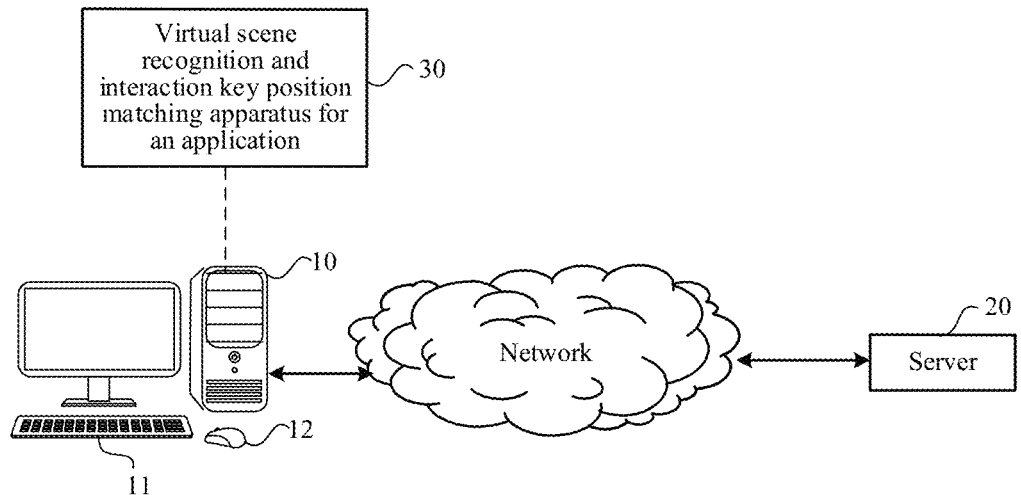
FIG. 1 is a schematic diagram of an application environment of a virtual scene recognition and interaction key position matching method and apparatus for an application according to an embodiment of this application.

FIG. 1 is a schematic diagram of an application environment of a virtual scene recognition and interaction key position matching method and apparatus for an application according to an embodiment of this application. As shown in FIG. 1, the application environment includes a computing device 10 and a server 20. The computing device 10 and the server 20 may be personal computers. The computing device 10 is provided with a keyboard 11 and a mouse 12. A mobile game application and a virtual scene recognition and interaction key position matching apparatus 30 for an application are installed on the computing device 10. The virtual scene recognition and interaction key position matching apparatus 30 for an application may be reflected in the form of a PC simulator, for example, a PC Android simulator for simulating an Android mobile game. The PC simulator is also briefly referred to as a simulator below.

The virtual scene recognition and interaction key position matching apparatus 30 for an application may perform a virtual scene recognition and interaction key position matching method for an application, and is configured to start an application in a virtual operating system; perform rendering processing on a to-be-presented virtual scene of the application, to obtain rendering data used for rendering the virtual scene; recognize a preset map picture in the rendering data; invoke a corresponding key position configuration file when it is recognized that the rendering data includes a preset map picture, to complete matching processing between the map picture and a corresponding physical key of the computing device; and present the virtual scene and key configuration information corresponding to the virtual scene on a display screen of the computing device.

The server 20 may be configured to cooperate with updating of a mobile game, and deliver updated pre-configuration data to the computing device 10. For example, the pre-configuration data includes operation coordinate data that is of a key and that needs to be set in a game. In this embodiment of this application, the keys include keys on the keyboard 11 and a left key and a right key of the mouse 12, and the like. In the descriptions of the embodiments of this application, a "mobile game" is also briefly referred to as a "game".

Figure 2:
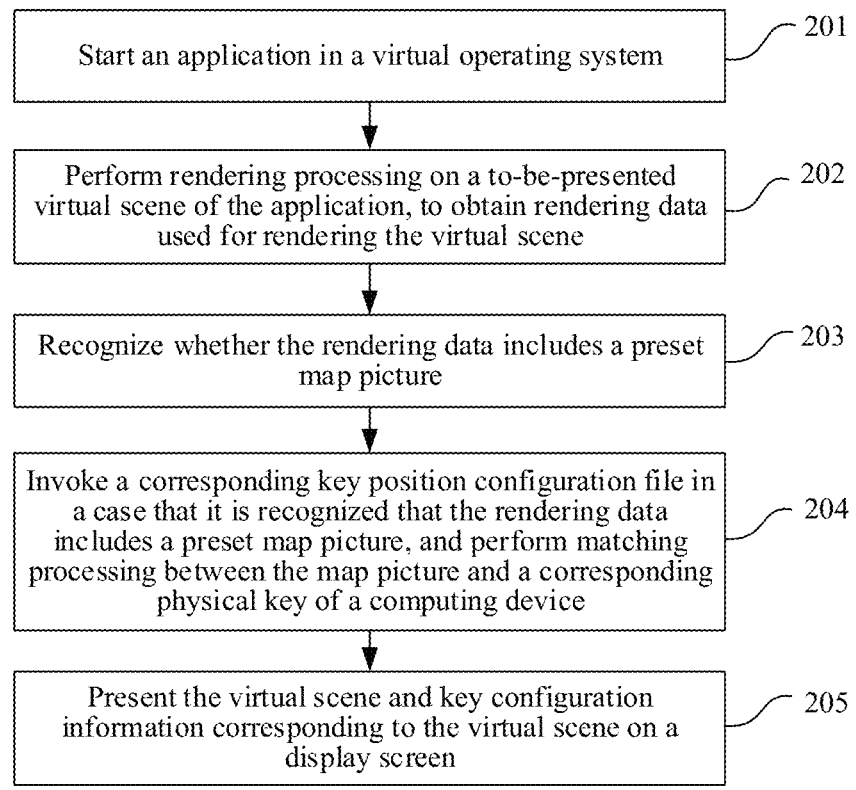
FIG. 2 is a schematic flowchart of a virtual scene recognition and interaction key position matching position method for an application according to an embodiment of this application.

FIG. 2 is a schematic flowchart of a virtual scene recognition and interaction key position matching position method for an application according to an embodiment of this application. The virtual scene recognition and interaction key position matching method for an application may be performed at a computing device, for example, a personal computer. As shown in FIG. 2, the virtual scene recognition and interaction key position matching method for an application includes the following steps.

Step 201. A computing device starts an application in a virtual operating system.

According to this embodiment of this application, for example, a first operating system runs on the computing device, and the application is an application applicable to a second operating system. Therefore, when the application applicable to the second operating system needs to run on the computing device, a virtual operating system the same as the second operating system needs to be constructed and run on the computing device on which the first operating system runs, and is configured to run the application applicable to the second operating system. A feasible manner is that a simulator is installed on the computing device, and the virtual operating system the same as the second operating system is constructed by a virtual machine, to provide an operating environment for the application.

The first operating system is, for example, an operating system such as Windows or Linux, the second operating system is, for example, an Android operating system, and the virtual operating system is, for example, a virtual Android operating system. The virtual machine (VM) is a complete computer system that is simulated through software, has a complete hardware system function, and runs in a completely isolated environment. The virtual operating system is a brand new virtual image of the second operating system, and has a function completely the same as that of the real second operating system. After the virtual operating system is entered, operations are performed in the independent virtual operating system. For example, the virtual operating system may independently install and run software, store data, and has an independent desktop of the virtual operating system, without affecting the first operating system on the computing device. In a possible implementation, the VM of this embodiment of this application may be, for example, a virtual box VM.

For example, a Windows operating system runs on the computing device, and a mobile game application is applicable to an Android operating system. When the mobile game application needs to run on the computing device, a simulator may run on the computing device, and the simulator constructs a virtual Android operating system by using a VM, to provide an operating environment for the mobile game application. After the simulator is run, a user may download a mobile game application from an interface of the simulator and start the mobile game application.

Step 202. The computing device performs rendering processing on a to-be-presented virtual scene of the application, to obtain rendering data used for rendering the virtual scene.

According to this embodiment of this application, when an application runs on the virtual operating system, various virtual scenes may need to be presented on a display screen according to a running logic requirement of the application. However, before the application presents the virtual scenes on the display screen, corresponding rendering processing operations need to be first performed on the to-be-presented virtual scenes in background. According to this embodiment of this application, the rendering processing operation of the application in the background is detected, to obtain information about a virtual scene that needs to be presented on the display screen, and then a current operating status of the application is learned according to the obtained information about the virtual scene that needs to be presented on the display screen, to perform corresponding processing. In a possible implementation, the corresponding processing is, for example, additional processing in addition to a running logic of the application. For example, a plug-in is set, and an upper-layer application based on a third-party application logic is developed. According to this embodiment of this application, the corresponding processing may be enabling a physical key to be valid and replacing a touch operation of a touchscreen originally supported by an application with a physical key operation in a virtual scene.

According to this embodiment of this application, an application may render a virtual scene by using a render function. When rendering one virtual scene, the application may perform rendering operations for a plurality of times, and invoke the render function for a plurality of times. A simulator detects each invocation of the render function and obtains rendering data associated each time the render function is invoked, that is, the simulator may obtain rendering data used for rendering the virtual scene.

For example, when a mobile game application runs on the computing device through a virtual Android operating system simulated by the simulator, a game scene needs to be presented on a display screen according to a game logic of the mobile game application, and the game scene is, for example, a game frame. The simulator may detect invocation of a render function by the application during each rendering operation in a process of rendering the game frame, and then obtain various rendering data used by the render function. There is a refresh operation after rendering of one game frame ends, and a next game frame starts to be rendered. The simulator may determine, by detecting the refresh operation, each invocation of the render function in a process of rendering one game frame.

Step 203. The computing device recognizes whether the rendering data includes a preset map picture.

According to this embodiment of this application, the simulator recognizes the preset map picture in the rendering data. In a possible implementation, the preset map picture is, for example, a map picture that needs to be used for determining a current operating status of an application and recognizing a current virtual scene, to perform additional processing in addition to a running logic of the application on the application. When detecting that rendering data used for rendering the virtual scene includes a preset map picture, the simulator may consider that the map picture is valid.

According to this embodiment of this application, when the application is a mobile game application, because a game frame may include a lot of map pictures, in the map pictures, some map pictures are map pictures of virtual operation buttons that may be operated by a game player. When the mobile game application runs on a mobile phone, the game player may perform a corresponding game operation by touching the virtual operation button displayed on a touchscreen by using a finger. Some map pictures are not map pictures of the virtual operation buttons and cannot be operated by the game player, for example, some prompt pictures.

Therefore, when a mobile game application is designed to run on the computing device, a simulator designer may preset a corresponding physical key for a map picture of a virtual operation button in a mobile game, to implement a touch function when a touchscreen is simulated by using a key function. The physical key may not be set for another map picture. The simulator designer may configure a map picture for which a corresponding physical key needs to be set, as a configuration file, which is referred to as a map picture configuration file. In a running process of a mobile game application, the simulator recognizes whether rendering data includes a preset map picture in the map picture configuration file.

In a possible implementation, the map picture configuration file may further include information such as a cyclic redundancy check (CRC) code of a map in which a map picture that needs to be detected is located, location coordinates of the map picture in the map in which the map picture is located, and an identifier (textureId), a height, a width, and a comment of the map picture. As an example, an identifier of a map picture may be, for example, represented by using a figure. The map picture is usually rectangular, and location coordinates of the map picture in a map in which the map picture is located may be represented by location coordinates of four corners of the map picture in the map.

For example, the map picture configuration file includes the following:

. . . <TextureId="30" width="512" height="512" max_bufsize="20480" CRC="1576852035" coordinate="1061945344, 1038876672, 1061945344, 1045823488, 1063518208, 1038876672, 1063518208, 1045823488" comm="DriveOnVehicle"/>. . . .

The example of the map picture configuration file is provided with map pictures that require a simulator to detect in a running process of an application and of which locations are {1061945344, 1038876672, 1061945344, 1045823488, 1063518208, 1038876672, 1063518208, 1045823488} in a map with a cyclic redundancy check code of 1576852035 in a rendered virtual scene.

When developing a mobile game, a mobile game developer usually puts some small pictures required for the mobile game into a big picture. In this embodiment of this application, the big picture is referred to as a map, and the small picture is referred to as a map picture. There may be a plurality of maps in a mobile game, each map has a corresponding identifier, and a location of each map picture in the map is fixed. The map may be in a picture format. The identifier of the map may be, for example, a name of the map, and the name of the map may be a string of digits or a character string.

Figure 3A:
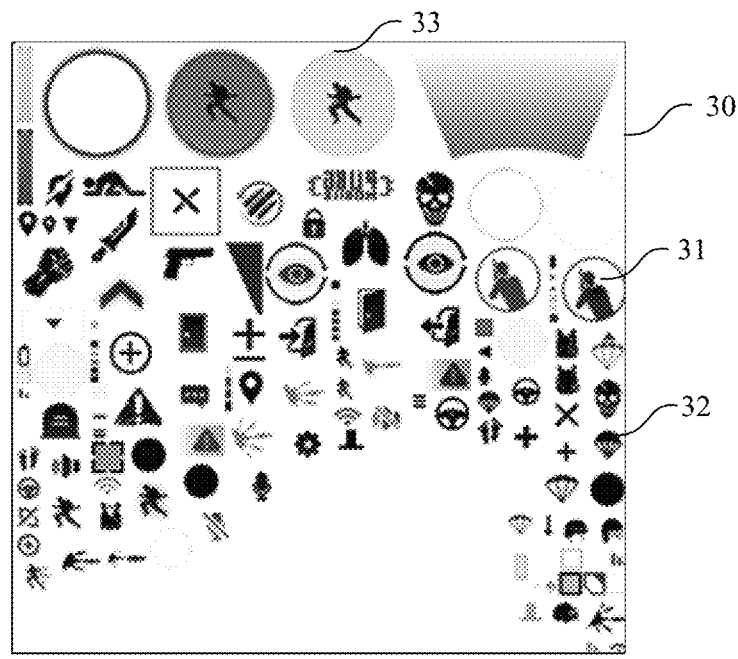
FIG. 3A is a schematic diagram of an example of a relationship between a map and a map picture in a mobile game according to an embodiment of this application.

FIG. 3A is a schematic diagram of an example of a relationship between a map and a map picture in a mobile game according to an embodiment of this application. As shown in FIG. 3A, a map 30 is a map in a player unknown's battle grounds (PUBG) game. There are various small map pictures in the map 30, for example, map pictures 31, 32, and 33.

Figure 3B:
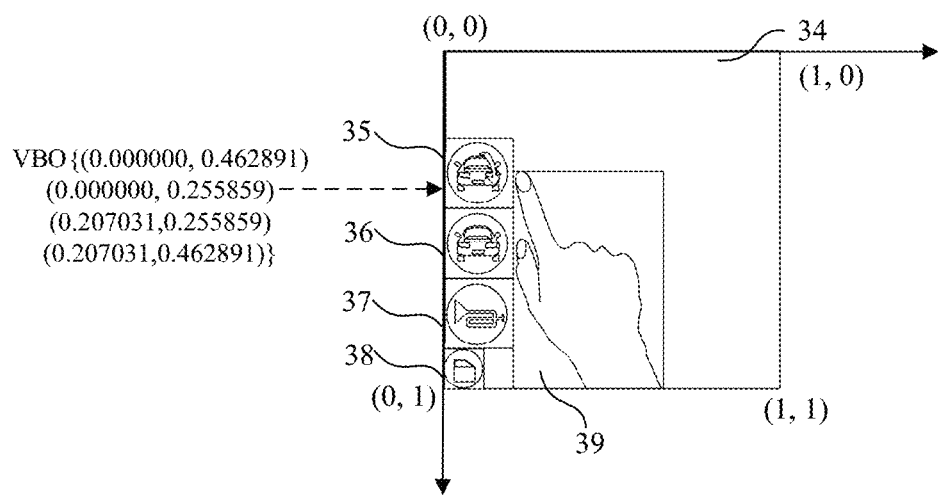
FIG. 3B is a schematic diagram of an example of location information of a map picture in a map in a mobile game according to an embodiment of this application.

FIG. 3B is a schematic diagram of an example of location information of a map picture in a map in a mobile game according to an embodiment of this application. As shown in FIG. 3B, there are five map pictures in a map 34, which are respectively marked as 35, 36, 37, 38, and 39. Location coordinates of the map picture 35 in the map 34 may be represented as {(0.000000, 0.462891), (0.000000, 0.255859), (0.207031, 0.255859), (0.207031, 0.462891)}. The coordinates (0.000000, 0.462891) represent a lower left corner of the map picture 35, the coordinates (0.000000, 0.255859) represent an upper left corner of the map picture 35, the coordinates (0.207031, 0.255859) represent an upper right corner of the map picture 35, and the coordinates (0.207031, 0.462891) represent a lower right corner of the map picture 35. The example given in the figure is an example of a map picture in an open graphics library for an embedded system (OpenGL ES). The OpenGL ES is an extension of an OpenGL and is mainly performed at embedded devices such as a mobile phone, a personal digital assistant (PDA), and a game console. For example, for the map picture 35 shown in FIG. 3B, when the map picture 35 is configured in the map picture configuration file, values of coordinates may be configured to correspond to coordinate values of four corners of the map picture 35.

When rendering a game frame, a render function uses an identifier of a map and location coordinates of a map picture in the map as data of the map picture. When detecting that an application renders a game frame on a display screen according to a game logic, a simulator compares an identifier of a map and location coordinates of a map picture in the map in rendering data used by a render function with an identifier of a preset map and location coordinates of a map picture in the preset map in the map picture configuration file, and determines whether the rendering data and the game frame includes a preset map picture for which a corresponding physical key needs to be set.

Step 204. The computing device, when it is recognized that the rendering data includes a preset map picture, invokes a corresponding key position configuration file and performs matching process between the map picture and a corresponding physical key of the computing device according to the key position configuration file.

According to this embodiment of this application, the simulator designer may set a map picture and related information of a corresponding physical key as a configuration file, which is referred to as, for example, a key position configuration file. The computing device may pre-store a key position configuration file required for an application. In a process in which an application runs on the computing device, when recognizing that a virtual scene includes a preset map picture, the simulator searches the key position configuration file according to the preset map picture for key information corresponding to the preset map picture, sets a key icon corresponding to a physical key in the virtual scene, and enables the physical key to be valid and operated. The key position configuration file may be downloaded from a server to the computing device and may be downloaded and updated from the server.

The key position configuration file may include information about a map picture for which a corresponding physical key needs to be set, for example, include an identifier (textureId) of the map picture, a description or name of the map picture (for example, a description of a function corresponding to the map picture), and a comment (Comm) of the map picture.

The key position configuration file further includes related information of a physical key corresponding to the map picture, for example, a name (itemname) of the physical key, screen location coordinates (point_x, point_y) corresponding to the physical key, and a function description of the physical key. The function of the physical key may be, for example, a function of a virtual operation button in a game associated with the map picture corresponding to the physical key. In addition, the key position configuration file may further configure a physical key to be valid when a rendered map picture is detected, and a corresponding key icon is displayed on a display screen and is in a user operable state.

For the same map picture, an identifier in the key position configuration file is the same as or corresponds to an identifier in the map picture configuration file, so that related information of the same map picture in the key position configuration file may be associated with that in the map picture configuration file.

According to this embodiment of this application, when an application is a mobile game application, when determining that a game scene includes a preset map picture in the map picture configuration file, the simulator may search for key information corresponding to the preset map picture according to the key position configuration file and enable a corresponding physical key to be valid.

For example, for a PUBG game, an F key, a G key, an H key, and the like on a keyboard corresponding to map pictures of picking up, an Alt key corresponding to a map picture of viewing surroundings, a right key corresponding to a map picture of aiming, a space key corresponding to a map picture of jumping, a C key corresponding to a map picture of crouching, a Z key corresponding to a map picture of getting down, an R key corresponding to a map picture of loading, a W key (forward), an S key (backward), an A key (left), and a D key (right) separately corresponding to a map picture of direction control, a Q key corresponding to a map picture of body left-leaning, an E key corresponding to a map picture of body right-leaning, a Y key corresponding to a map picture of turning on/off a microphone, a T key corresponding to a map picture of turning on/off the sound, number keys such as 1, 2, and 3 corresponding to map pictures of weapon switching, a Table key corresponding to a map picture of a backpack, a Q key corresponding to a map picture of pressing a car head, an E key corresponding to a map picture of raising a car head, an F key corresponding to a map picture of getting off, a left mouse button corresponding to a map picture of whistling, a right mouse button corresponding to a map picture of shooting by a left hand, and the like may be preset in the key position configuration file. In addition, the key position configuration file further includes screen location coordinates corresponding to the physical keys.

When configuring the key position configuration file, the computing device may configure one-key multi-use, so that the same physical key may have different operation functions in different game scenes.

Step 205. The computing device presents the virtual scene and key configuration information corresponding to the virtual scene on a display screen.

According to this embodiment of this application, the key configuration information may be related information of keys, for example, a key icon of a physical key.

The display screen is of the computing device and is a hardware device under a first operating system. Therefore, when the virtual scene and the key configuration information are presented, the virtual scene and the key configuration information may be presented on the display screen under the first operating system. Further, the simulator presents the virtual scene on the display screen under the first operating system, and displays a key icon of a set physical key at screen location coordinates corresponding to the physical key.

In a possible implementation, when presenting the virtual scene, the simulator may convert coordinates of the virtual scene under a virtual operating system into coordinates under the first operating system and present the virtual scene on the display screen. For example, coordinates of a virtual scene under an Android operating system are converted into coordinates under a Windows operating system.

According to this embodiment of this application, a name of a physical key may be set on a background picture to form the key icon. The shape of the background picture may be a circle, an elliptical shape, or the like, a center position of the background picture is set within a display area of a map picture corresponding to the physical key, so that there is an overlapping area between the background picture and the display area of the map picture. According to this embodiment of this application, the key icon of the physical key may alternatively be set at a preset location. When a key icon is set, a main image of a map picture may be prevented, to the greatest extent, from being blocked. The background picture may be set to have a specific transparency.

Figure 4A:
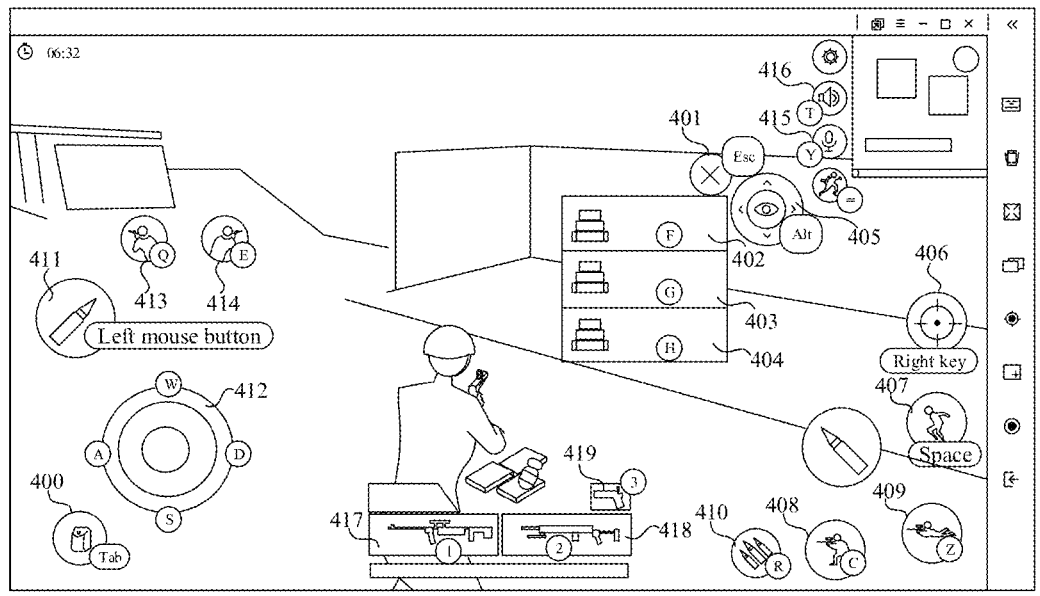
FIG. 4A is a schematic diagram of an example of a game scene according to an embodiment of this application.

FIG. 4A is a schematic diagram of an example of a game scene according to an embodiment of this application, and is a game frame of a PUBG game. In the game frame, the simulator sets that a map picture 400 of a backpack corresponds to a Table key, map pictures 402, 403, and 404 of picking up correspond to an F key, a G key, and an H key, a map picture 405 of viewing surroundings corresponds to an Alt key, a map picture 406 of aiming corresponds to a right mouse button, a map picture 407 of jumping corresponds to a space key, a map picture 408 of crouching corresponds to a C key, a map picture 409 of getting down corresponds to a Z key, a map picture 410 of loading corresponds to an R key, a map picture 411 of shooting by a left hand corresponds to a left mouse button, a map picture 412 of direction control corresponds to a W key, an S key, an A key, a D key, a map picture 413 of body left-leaning corresponds to a Q key, a map picture 414 of body right-leaning corresponds to an E key, a map picture 415 of turning on/off a microphone corresponds to a Y key, a map picture 416 of turning on/off the sound corresponds to a T key, and map pictures 417, 418, and 419 of weapon switching correspond to number keys 1, 2, and 3.

Figure 4B:
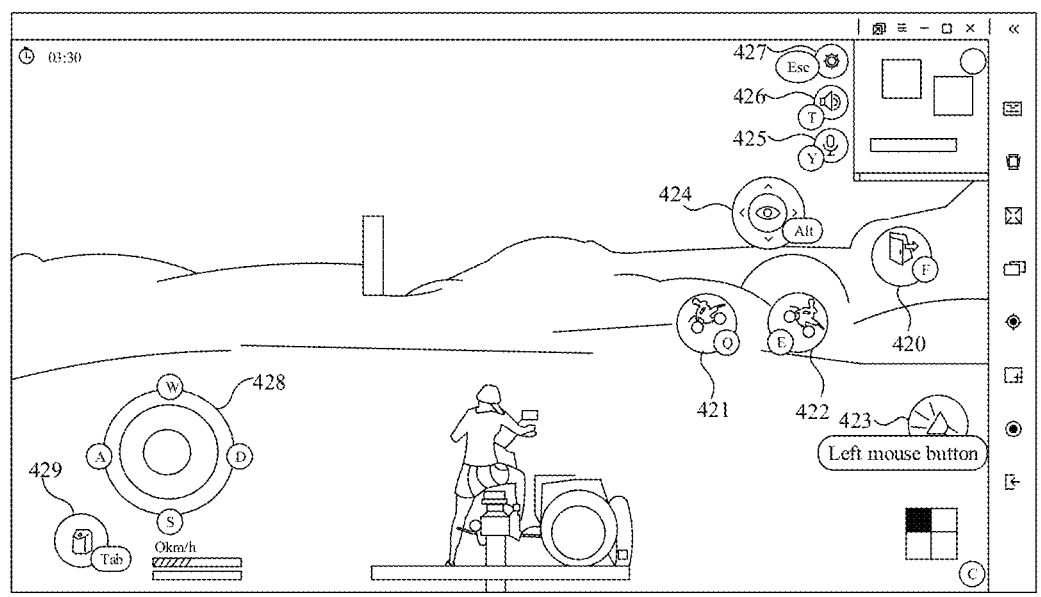
FIG. 4B is a schematic diagram of another example of a game scene according to an embodiment of this application.

FIG. 4B is a schematic diagram of another example of a game scene according to an embodiment of this application. As shown in FIG. 4B, in the game frame, the simulator sets that a map picture 420 of getting off, a map picture 421 of pressing a car head, a map picture 422 of raising a car head, and a map picture 423 of whistling respectively correspond to an F key, a Q key, an E key, and a left mouse button. In addition, a map picture 425 of turning on/off a microphone, a map picture 426 of turning on/off the sound, and a map picture 427 of game setting are set to respectively correspond to a Y key, a T key, and an Esc key. A map picture 424 of viewing surroundings is set to correspond to an Alt key, a map picture 428 of direction control is set to correspond to a W key, an S key, an A key, and a D key, and a map picture 429 of a backpack is set to correspond to a Table key.

The key does not clearly indicate a key on a mouse or a key on a keyboard.

According to this embodiment of this application, an application is started in a virtual operating system, rendering processing is performed on a to-be-presented virtual scene of the application, to obtain rendering data used for rendering the virtual scene, a preset map picture in the rendering data is recognized, a corresponding key position configuration file is invoked when it is recognized that the rendering data includes a preset map picture, to complete matching processing between the map picture and a corresponding physical key of the computing device, and the virtual scene and key configuration information corresponding to the virtual scene are presented on a screen of the computing device. According to the embodiments of this application, a game scene can be quickly and efficiently recognized based on recognition of a map picture in a game, and game operation keys are automatically and properly distributed in the recognized game scene dynamically in real time, so that the game operation keys are intelligently set. A game player does not need to set the game operation key in the game scene, and only needs to operate a corresponding physical key on a keyboard and a mouse according to the game operation key automatically set by the computing device to operate a mobile game. The key setting manner based on game scene recognition can enable the game player to have relatively good game operation experience, is relatively intelligent, and has a better effect.

Figure 5:
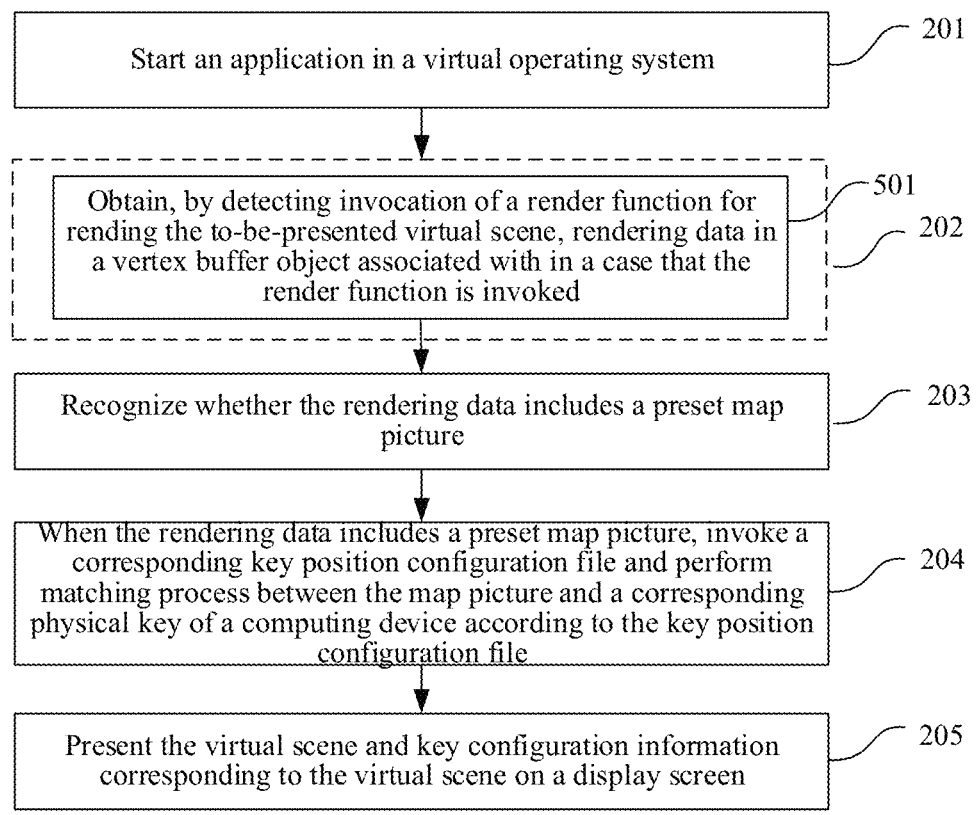
FIG. 5 is a schematic flowchart of performing rendering processing on a to-be-presented virtual scene of an application, to obtain rendering data used for rendering the virtual scene according to an embodiment of this application.

FIG. 5 is a schematic flowchart of performing rendering processing on a to-be-presented virtual scene of an application, to obtain rendering data used for rendering the virtual scene according to an embodiment of this application. FIG. 5 may be a further description of step 202 in FIG. 2, or may be a further description of the same or similar step in another embodiment. As shown in FIG. 5, step 202 may include the following steps.

Step 501. The computing device obtains, by detecting invocation of a render function for rending the to-be-presented virtual scene, rendering data in a vertex buffer object associated with when the render function is invoked.

When rendering a virtual scene, an application may use a function in an open graphics library (OpenGL), for example, a glDrawElements function.

The OpenGL defines a cross-programming language and cross-platform application programming interface (API) standard. A graphic rendering requirement of an application is finally processed by a rendering-related program such as a video card driver implementing an OpenGL protocol. In a process in which the OpenGL performs graphic rendering, a series of computer graphics operations such as vertex transformation, graphical element assembly, texture mapping, and rasterization may need to be performed.

The glDrawElements function is a graphical element render function, and obtains data from an array to draw or render a graphical element. In a possible implementation, the graphical element is, for example, a triangle, a line, or a point. In this embodiment of this application, that a rendered graphical element is a triangle is used as an example for description. As an example, function parameters in the glDrawElements function include, for example, a graphical element mode, used for describing a mode of a graphical element to be drawn or rendered; a count, representing a total quantity of vertexes connected according to the graphical element mode, according to different modes, the count being less than or equal to a quantity of vertexes of a graphical element with a single mode type*a quantity of graphical elements; a type of an index value, which is one of the following values: GL_UNSIGNED_BYTE, GL_UNSIGNED_SHORT, and GL_UNSIGNED_INT; and indices, pointing to an index storage location. When the glDrawElements function is invoked, the function creates a series of graphical elements by indexing a series of elements using numbers indicated by the count value.

The OpenGL includes various library functions, for example, a basic library function, a utility library function, an auxiliary library function, and a utility tool library function. An API function that operates a vertex buffer object (VBO) is provided in the OpenGL. The VBO is an internal memory cache area created by the OpenGL in a video card storage space and used for storing various types of attribute information of a vertex. The attribute information may include, for example, vertex color data, vertex coordinates, texture coordinates, and a vertex normal vector. Vertex is a basic concept in computer graphics. In computer graphics, a two-dimensional or three-dimensional object may be drawn, for example, by using triangles (graphical element). Each triangle has three vertexes, and each vertex has a 3D location. A 3D location of a vertex of a triangle may be defined by using an array. Because the OpenGL works in a 3D space and renders a 2D triangle, z coordinates of a vertex of the triangle may be set to (0, 0). Vertex coordinates are used as an input and inputted into a vertex shader, and the vertex shader creates internal memories on a graphics processing unit (GPU) to store the vertex coordinates, configures how the OpenGL interprets these memories, and specifies how to send the vertex coordinates to a video card. Vertex coordinates are three-dimensional coordinates, and a display screen is two-dimensional, and a final display location of a vertex on the display screen may be obtained by calculating vertex coordinates of the vertex.

When rendering is performed, a render function, for example, the glDrawElements function described above, may read various types of attribute information of a vertex from the VBO for use.

According to this embodiment of this application, the simulator may obtain, by detecting invocation of a glDrawElements function for rendering a to-be-presented virtual scene, rendering data in a VBO associated with when the render function is invoked.

According to this embodiment of this application, the rendering data in the VBO associated with when the render function is invoked is obtained by detecting invocation of the render function for rendering the to-be-presented virtual scene, and a current operating status of an application may be obtained in real time to perform corresponding processing.

Figure 6:
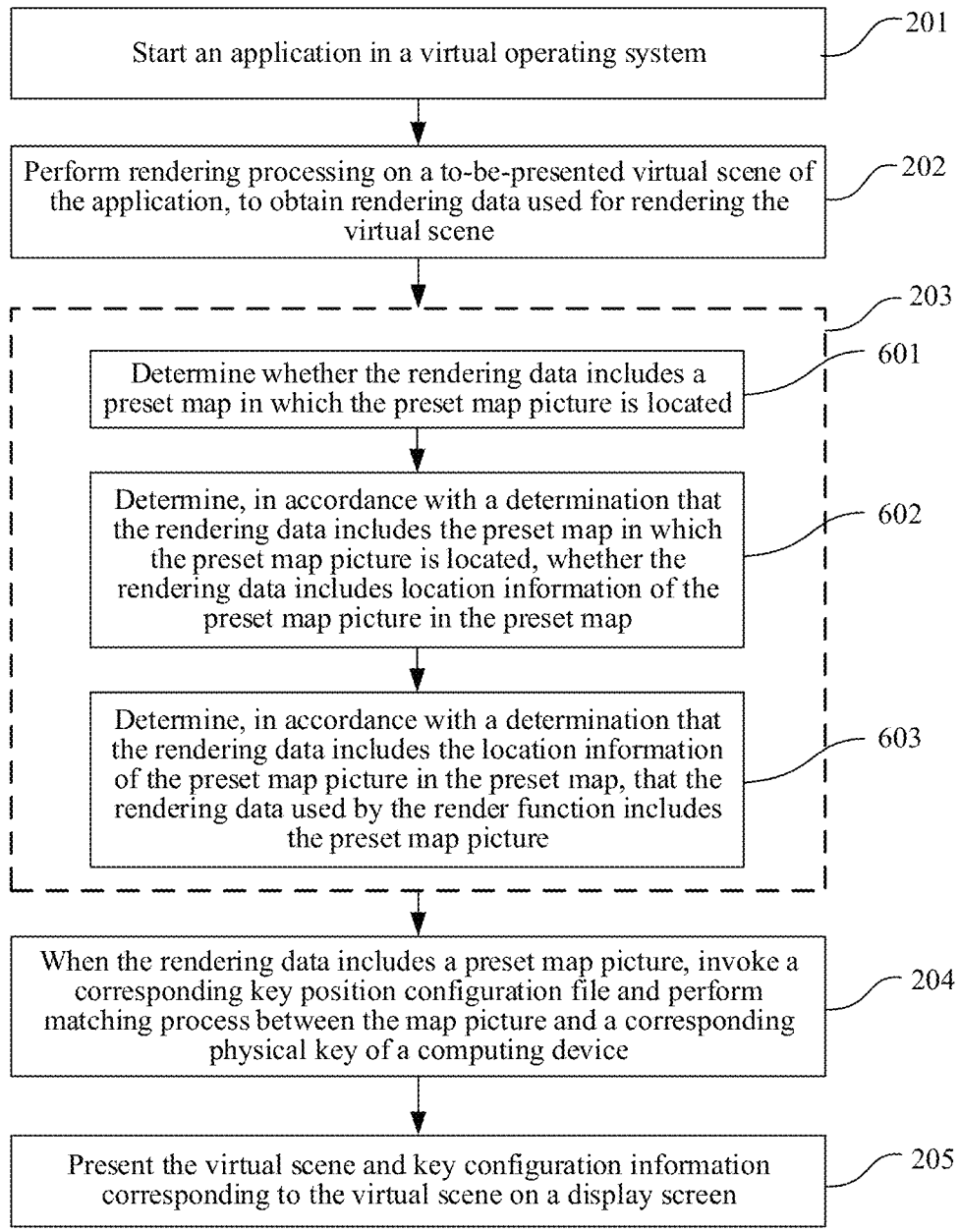
FIG. 6 is a schematic flowchart of recognizing a preset map picture in rendering data according to an embodiment of this application.

FIG. 6 is a schematic flowchart of recognizing a preset map picture in rendering data according to an embodiment of this application. FIG. 6 may be a further description of step 203 in FIG. 2, or may be a further description of the same or similar step in another embodiment.

In the OpenGL, a texture mapping operation during graphic rendering is also referred to as texture map operation, and is to attach a map picture as a texture to a surface of an item to be rendered to enhance a sense of reality. The texture mapping operation is performed by using a triangle as a unit, a corresponding location of each vertex of a triangle on a surface of an item in the map needs to be specified, and then mapping is performed. According to this embodiment of this application, the item to be rendered is an object in a game. As an example, the texture mapping operation may be performed, for example, by using a glDrawElements function.

According to this embodiment of this application, when detecting that an application program renders a game frame, the simulator may detect that the application invokes the glDrawElements function for performing texture mapping. The simulator obtains an identifier of a map corresponding to a vertex to be rendered by analyzing vertex data in a VBO used by the function. The simulator may recognize, according to an identifier of the map, a map used for rendering the game frame. In addition, the simulator obtains texture coordinates of a map picture in the map corresponding to the vertex from the VBO. The texture coordinates of the map picture may be used for positioning the corresponding map picture in the map.

Step 203 may include the following steps.

Step 601. The computing device determines whether the rendering data includes a preset map in which the preset map picture is located.

According to this embodiment of this application, the simulator may determine whether rendering data includes a preset map in which a preset map picture is located by comparing an identifier of a map included in the rendering data in the VBO with a recorded identifier of the preset map. When the identifier of the map in the rendering data matches the recorded identifier of the preset map, the simulator determines that the rendering data includes the identifier of the preset map in which the preset map picture is located, that is, determines that there is a map picture that needs to be further processed in a currently rendered virtual scene, for example, setting a corresponding physical key.

Figure 7:
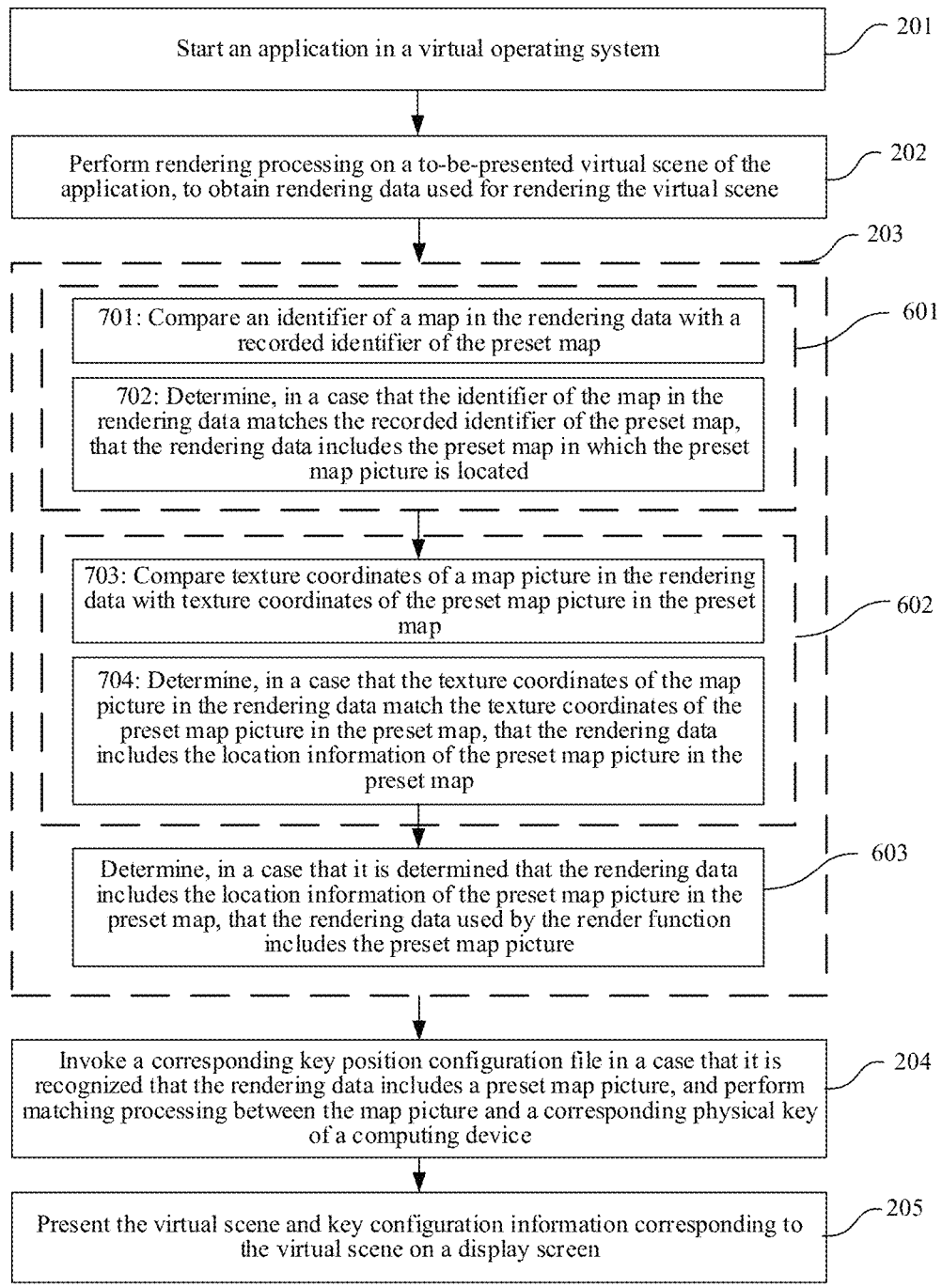
FIG. 7 is a schematic flowchart of a detailed description of step 601 and step 602 in FIG. 6 according to an embodiment of this application.

FIG. 7 is a detailed description of steps 601 and 602 in FIG. 6. As shown in FIG. 7, step 601 may include the following steps.

Step 701. The computing device compares an identifier of a map in the rendering data with a recorded identifier of the preset map.

Step 702. The computing device determines, when the identifier of the map in the rendering data matches the recorded identifier of the preset map, that the rendering data includes the preset map in which the preset map picture is located.

When running an application through the simulator, the computing device loads all maps that may be used in the application from a hard disk to an internal memory. Therefore, after starting an application, the simulator detects that a virtual operating system loads application data from a hard disk into an internal memory of a video card. The application data includes a map used by an application. According to this embodiment of this application, a glTexImage2D function is invoked when a map is loaded into an internal memory.

By detecting the glTexImage2D function, the simulator may obtain a cyclic redundancy check code of each map. The simulator verifies the obtained cyclic redundancy check code of the map and compares the cyclic redundancy check code with a cyclic redundancy check code of a preset map in the map picture configuration file, to determine whether the cyclic redundancy check code of the map in the application data matches the cyclic redundancy check code of the preset map. When determining that the cyclic redundancy check code of the map in the application data matches the cyclic redundancy check code of the preset map in the map picture configuration file, the simulator records an identifier (ID) of the map in the application data as an identifier of the preset map. As an example, the identifier of the map may be, for example, a numeric string. This is not specifically limited in this embodiment of this application.

For a map, each time an application is started, different identifiers may be allocated to the map. A cyclic redundancy check code of the map is unchanged. Because when the application uses a map, an identifier of the map is used, a cyclic redundancy check code of a map to be detected needs to be configured in the map picture configuration file, and an identifier of the map in the application data is determined according to the cyclic redundancy check code of the map, to detect whether the map is used by the application.

Figure 8:
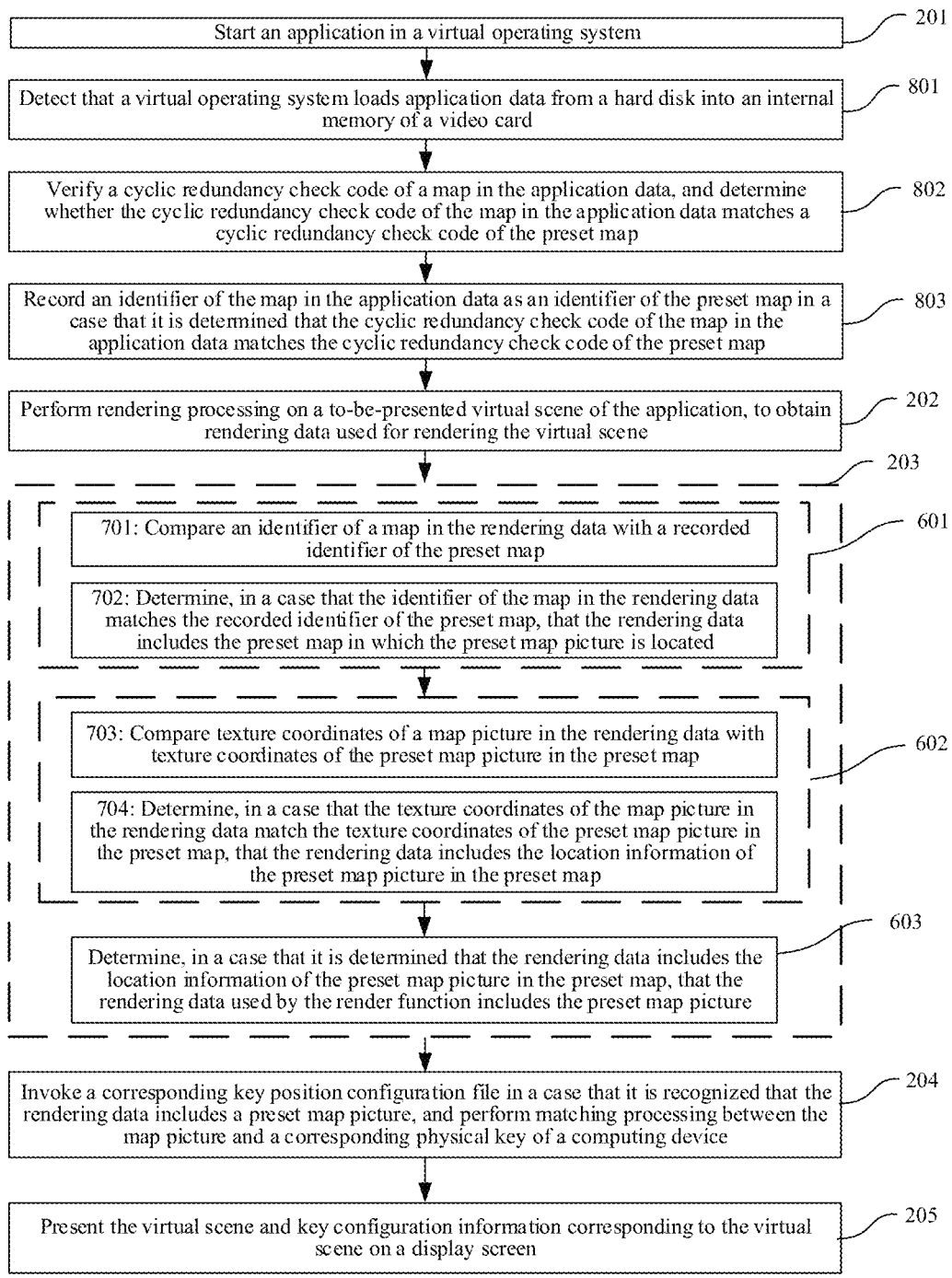
FIG. 8 is a further schematic flowchart of a virtual scene recognition and interaction key position matching method for an application according to an embodiment of this application.

FIG. 8 is a further schematic flowchart of a virtual scene recognition and interaction key position matching method for an application according to an embodiment of this application. As shown in FIG. 8, after the starting an application in step 201, the method may further include the following steps.

Step 801. The computing device detects that a virtual operating system loads application data from a hard disk into an internal memory of a video card.

Step 802. The computing device verifies a cyclic redundancy check code of a map in the application data, and determines whether the cyclic redundancy check code of the map in the application data matches a cyclic redundancy check code of the preset map.

Step 803. The computing device records an identifier of the map in the application data as an identifier of the preset map when it is determined that the cyclic redundancy check code of the map in the application data matches the cyclic redundancy check code of the preset map.

According to this embodiment of this application, when detecting that a virtual operating system loads application data from a hard disk to an internal memory of a video card through the glTexImage2D function, the simulator verifies a cyclic redundancy check code of a map in an application, compares the cyclic redundancy check code of the map in the application with a cyclic redundancy check code of a preset map in the map picture configuration file, and records an identifier of the map in the application data as an identifier of the preset map when the cyclic redundancy check code of the map in the application matches the cyclic redundancy check code of the preset map in the map picture configuration file.

Step 602. The computing device determines, when it is determined that the rendering data includes the preset map in which the preset map picture is located, whether the rendering data includes location information of the preset map picture in the preset map.

In the step, as shown in FIG. 7 and FIG. 8, the determining whether the rendering data includes location information of the preset map picture in the preset map includes the following steps.

Step 703. The computing device compares texture coordinates of a map picture in the rendering data with texture coordinates of the preset map picture in the preset map.

Step 704. The computing device determines, when the texture coordinates of the map picture in the rendering data match the texture coordinates of the preset map picture in the preset map, that the rendering data includes the location information of the preset map picture in the preset map.

In a possible implementation, the simulator may compare texture coordinates of a map picture corresponding to a rendered vertex in rendering data with texture coordinates of a preset map picture configured in the map picture configuration file, and determine that the rendering data includes location information of the preset map picture in the preset map when the texture coordinates of the map picture corresponding the rendered vertex in the rendering data match the texture coordinates of the preset map picture configured in the map picture configuration file.

As an example, a VBO used by a render function of a glDrawElements function includes texture coordinates of a map picture used by the render function, that is, location coordinates of the map picture in a map in which the map picture is located. According to this embodiment of this application, coordinates of a map or a texture image may range, for example, from (0, 0) to (1, 1), and the coordinates are normalized coordinates. For example, coordinates at an upper left corner of a map are (0, 0) and coordinates at a lower right corner are (1, 1). A location of each map picture in the map may be represented by locations of four corners of each map picture in a coordinate system of the map. Referring to FIG. 3B, a map 34 and a map picture 35 are shown.

Using FIG. 3B as an example, according to this embodiment of this application, when recognizing a map picture in a game frame, the simulator may analyze a VBO used by the glDrawElements function, search for an identifier of the map 34, search for that texture coordinates are {(0.000000, 0.462891), (0.000000, 0.255859), (0.207031, 0.255859), (0.207031, 0.462891)}, and determine, according to the searched for texture coordinates, that the current game frame uses the map picture 35 in the map 34.

Step 603. The computing device determines, when it is determined that the rendering data includes the location information of the preset map picture in the preset map, that the rendering data used by the render function includes the preset map picture.

According to this embodiment of this application, when determining that rendering data in a VBO includes a preset map in which a preset map picture is located and texture coordinates of the preset map picture in the preset map in which the preset map picture is located, the simulator determines that the rendering data includes the preset map picture that is to be detected and that is in the map picture configuration file.

According to the virtual scene recognition and interaction key position matching method for an application in this embodiment of this application, texture coordinates of a map picture in a map in a game are fixed, and for a map picture in the map, texture coordinates of the map picture used during each rendering are the same. Therefore, rendering data used by a render function is searched for by detecting the render function invoked when a game frame is rendered. Whether the rendering data includes a preset map in which a preset map picture is located is determined, when it is determined that the rendering data includes the preset map, whether the rendering data includes location information of the preset map picture in the preset map is determined, and when it is determined that the rendering data includes the location information of the preset map picture in the preset map, it is determined that the rendering data used by the render function includes the preset map picture. A game state can be precisely determined only through comparison between several coordinate values, whether a map picture is to be displayed by a game is quickly learned, and a quantity of processed bytes is relatively small, so that a speed of rendering a game frame by the computing device is higher, the required computing resource overheads are fewer, and the performance is higher.

Figure 9:
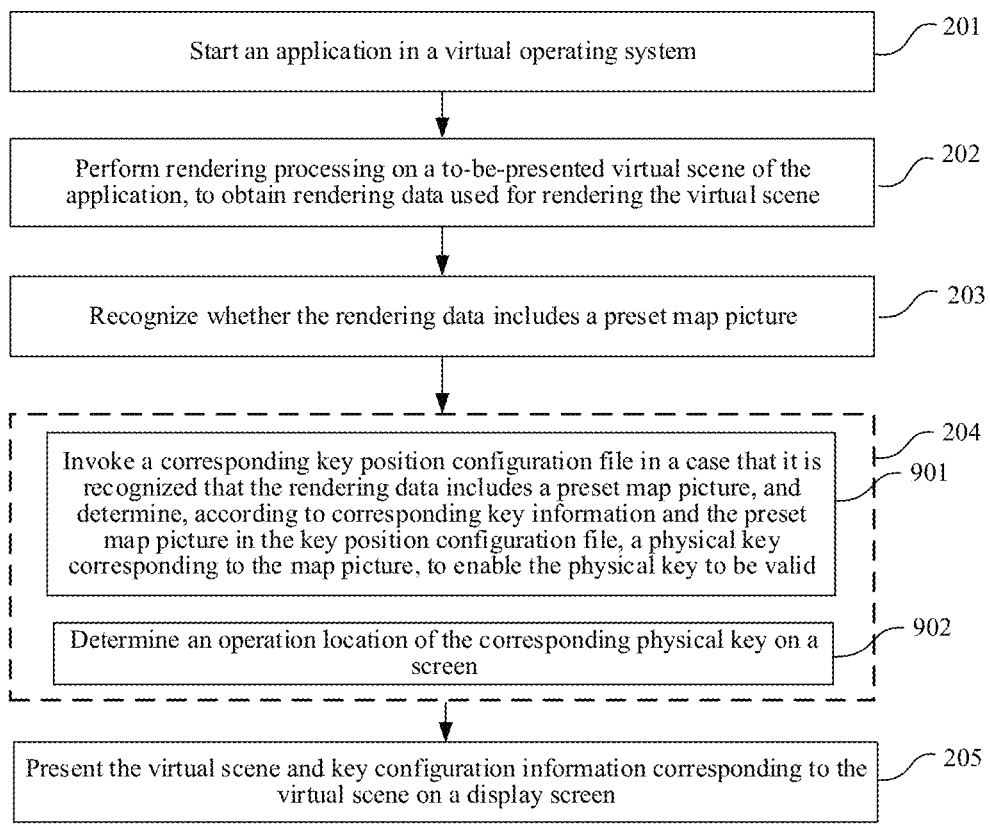
FIG. 9 is a schematic flowchart of invoking a corresponding key position configuration file when it is recognized that rendering data includes a preset map picture, to complete matching processing between the map picture and a corresponding physical key of a computing device according to an embodiment of this application.

FIG. 9 is a schematic flowchart of invoking a corresponding key position configuration file when it is recognized that rendering data includes a preset map picture, to complete matching processing between the map picture and a corresponding physical key of a computing device according to an embodiment of this application. FIG. 9 uses a further description of step 204 in FIG. 2 as an example, and is also applicable to descriptions of the same or similar steps in other embodiments.

As shown in FIG. 9, step 204 may include the following steps.

Step 901. The computing device invokes a corresponding key position configuration file when it is recognized that the rendering data includes a preset map picture, and determines, according to corresponding key information and the preset map picture in the key position configuration file, a physical key corresponding to the preset map picture, to enable the physical key to be valid.

According to this embodiment of this application, after determining, by comparing a map picture in the map picture configuration file with a map picture in rendering data used by a render function for rendering a virtual scene, a preset map picture for which a corresponding physical key needs to be set in a current virtual scene, the simulator may search the key position configuration file for key information corresponding to the preset map picture. For example, the simulator may compare an identifier of the preset map picture obtained from the map picture configuration file with an identifier of a map picture in the key position configuration file, and determine a name of a physical key corresponding to the identifier of the map picture and screen location coordinates corresponding to the physical key according to the key position configuration file after the identifier of the preset map picture matches the identifier of the map picture.

For example, the key position configuration file is as follows:

```
<Switch Name="GetIntoCar" TextureId="30'
Comm="DriveOnVehicle"/>... ...<KeyMapping ItemName="F" Point_X="0.656250"
Point_Y="0.419444" Description="GetIntoCar">
    <SwitchOperation Description="GetIntoCar" EnableSwitch="GetIntoCar"/>
    </KeyMapping>
```

The key position configuration file configures an identifier (textureId) of a map picture as "30", a name as "GetIntoCar", and a comment as "DriveOnVehicle". Meanwhile, the key position configuration file is configured to obtain screen location coordinates (0.656250, 0.419444) corresponding to a key "F" when the map picture "GetIntoCar" in the key position configuration file is matched.

The simulator searches for an itemname "GetIntoCar" corresponding to a map picture with a textureId of "30" according to the identifier of the example of the map picture configuration file, and then enables the map picture of GetIntoCar to be valid through EnableSwitch in a SwitchOperation statement. Then, a corresponding key "F" is searched for according to the "GetIntoCar", a horizontal coordinate of the key F corresponding to a screen location is 0.656250, and a vertical coordinate is 0.419444. That is, the key F on the keyboard is valid. As an example, screen location coordinates corresponding to a physical key may be, for example, a location of center of a key icon of the physical key on a display screen.

In the key position configuration file, the same physical key may be configured to be valid when different map pictures are valid through a plurality of SwitchOperation statements. As an example, the priority of a map picture sorted on the top is the highest. The SwitchOperation statement may also carry the screen location coordinates corresponding to the physical key In this case, when a map picture is valid, another map picture is invalid, and the screen location coordinates corresponding to the physical key can only be coordinates in the SwitchOperation statement in which the valid map picture is located. This configuration is more flexible.

Step 902. Determine an operation location of the physical key corresponding to the preset map picture on a display screen.

In a possible implementation, for example, the simulator may determine an operation location of a corresponding physical key on a display screen according to screen location coordinates corresponding to the physical key in the key position configuration file; or determine an operation location of a corresponding physical key on a display screen according to a display location of the preset map picture on the display screen.

For determining the operation location of the corresponding physical key on the screen according to the screen location coordinates corresponding to the physical key in the key position configuration file, such a determining method is simple and has universality, and is also applicable to a case that the operation location of the physical key on the display screen is not conveniently determined according to the display location of the preset map picture on the display screen.

For example, in a PUBG game, assuming that a character representing a game player dies in the game, there is a square image at a location in a game scene. When detecting a map picture of the image, the simulator learns that the game ends, and the user needs to confirm whether to exit. However, an operation cannot be performed at a location of the image, and the operation needs to be performed at a location of an exit button. Therefore, in this case, an operation location of a physical key performing an exit operation on the display screen is pre-configured in the key position configuration file. In a running process of the game, if the simulator detects that the game scene includes the square map picture, a key icon of a corresponding physical key is set at the location of the exit button for the user to perform the exit operation.

A case of determining an operation location of the corresponding physical key on the display screen according to the display location of the preset map picture on the display screen may include the following steps:

searching for vertex coordinates that are in the rendering data used by the render function and that are to be rendered in the preset map picture;

obtaining a display area of the preset map picture on the display screen through calculation according to the vertex coordinates; and obtaining the operation location of the corresponding physical key on the display screen through calculation according to the display area of the preset map picture on the display screen.

According to this embodiment of this application, for example, when detecting that an application renders a game frame according to a game logic, the simulator may search for vertex coordinates of a triangle in the game frame rendered by a map picture from a VBO used by a render function of a glDrawElements function. The vertex coordinates may be, for example, vertex coordinates of a triangle forming various types of operation buttons. As an example, the vertex coordinates may be, for example, a location of a vertex under an Android operating system on a display screen based on a screen location of a second operating system. As an example, under the Android operating system, a top left corner on the display screen is a coordinate origin (0, 0), and a bottom right corner is a maximum value of coordinates. For example, if a screen resolution is 1024*576 under the Android operating system, then the maximum value of the coordinates is (1024, 576).

For example, when a triangle in a game frame is rendered by using a map picture of a square, two triangles are required. Each triangle has three vertexes, for example, the first triangle includes a vertex 1, a vertex 2, and a vertex 3, and the second triangle includes a vertex 4, a vertex 5, and a vertex 6. In the two triangles, there are two overlapping vertexes. The computing device may obtain vertex coordinates for each vertex of the two triangles.

Then, the simulator may obtain a display location of the map picture on the display screen through calculation according to the vertex coordinates of the triangle in the game frame. For example, the simulator may calculate an actual display location and a display area of a map picture under the first operating system on the display screen through a model transformation, a view transformation, and a projection transformation, and then through a viewport transformation according to the vertex coordinates of the triangle in the game frame. The model transformation, the view transformation, and the projection transformation are briefly referred to as an MVP transformation. In addition, after obtaining the vertex coordinates of the triangle in the game frame, the simulator may calculate the display location of a map picture pasted on the triangle in the game frame on the display screen under the first operating system according to the vertex coordinates of the triangle in the game frame.

According to this embodiment of this application, for example, the simulator may first determine a display area of a map picture on a display screen according to a display location of the map picture on the display screen under the first operating system, and then determine, according to the display area of the map picture on the display screen, an operation location of a physical key corresponding to the map picture on the display screen to be located in the display area.

According to the virtual scene recognition and interaction key position matching method for an application in this embodiment of this application, key information corresponding to a preset map picture is searched for in a key position configuration file, a corresponding physical key is determined, and an operation location of the physical key on a display screen is determined, to set the physical key. The computing device may dynamically set the corresponding physical key in real time and enable the physical key to be valid, so that a game player may operate a game in real time, and has better game operation experience.

Figure 10:
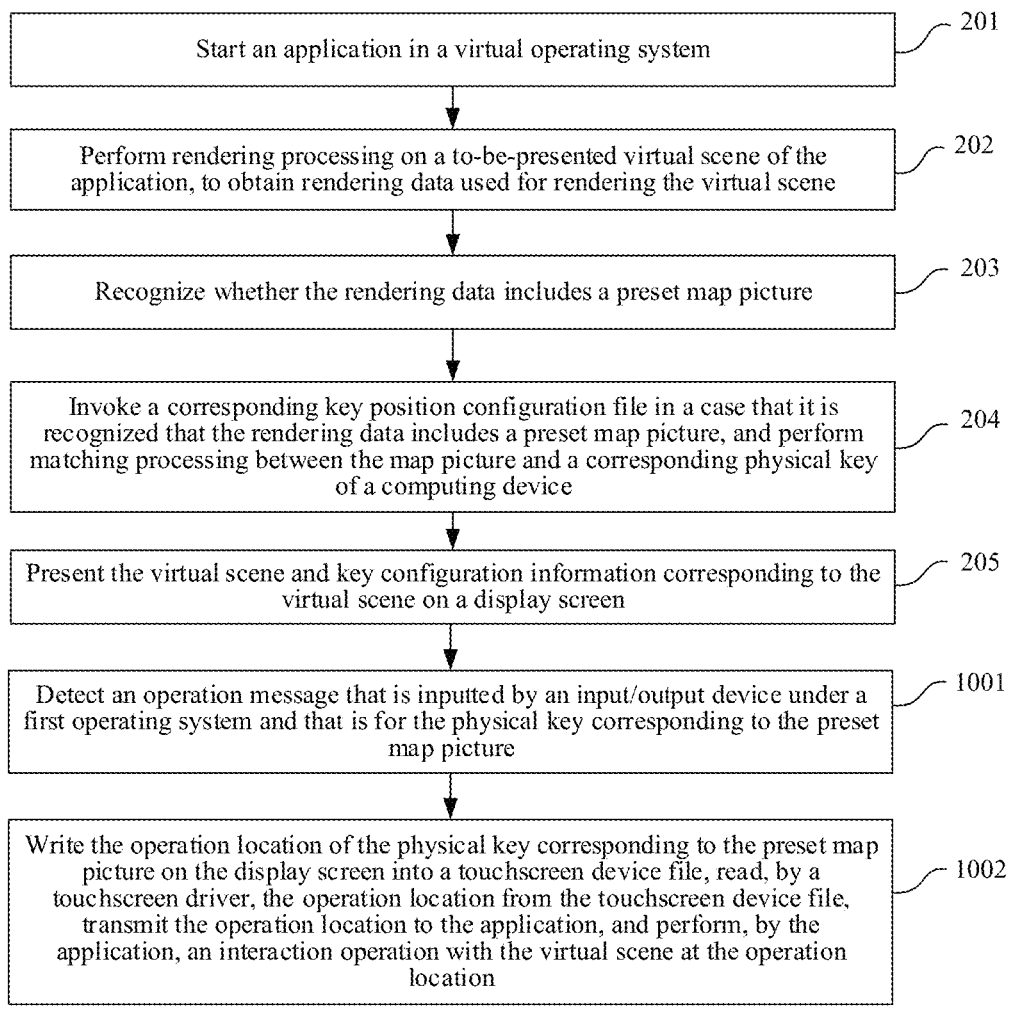
FIG. 10 is a further schematic flowchart of a virtual scene recognition and interaction key position matching method for an application according to an embodiment of this application.

FIG. 10 is a further schematic flowchart of a virtual scene recognition and interaction key position matching method for an application according to an embodiment of this application. As shown in FIG. 10, in addition to steps shown in FIG. 2, the virtual scene recognition and interaction key position matching method for an application of this application includes the following steps.

Step 1001. Detect an operation message that is inputted by an input/output device under a first operating system and that is for the physical key corresponding to the preset map picture.

According to this embodiment of this application, the simulator detects an operation message inputted by a user through an input/output device such as a keyboard and a mouse under a first operating system of the computing device, and the operation message is an operation message used for operating key icons in a virtual scene displayed on a display screen.

In the case of a game, the simulator determines, through a Hook Windows message, that a game player has pressed a physical key on a keyboard or a mouse, and then checks whether the physical key is valid in the key position configuration file. When it is determined that the game player presses the corresponding physical key on the keyboard or the mouse, the operation is determined to be valid. The corresponding physical key corresponds to a key icon in a game scene displayed on the display screen.

Step 1002. Write the operation location of the physical key corresponding to the preset map picture on the display screen into a touchscreen device file, read, by a touchscreen driver, the operation location from the touchscreen device file, transmit the operation location to the application, and perform, by the application, an interaction operation with the virtual scene at the operation location.

As described above, the simulator may obtain, through the key position configuration file, an operation location of a physical key needing to be set on the display screen, or obtain, according to location information of a map picture, an operation location of a physical key needing to be set on the display screen. Then, when detecting that a game player triggers an operation on a key icon displayed on the display screen, the simulator writes operation data corresponding to the physical key into a touchscreen device file of an Android operating system. The operation data corresponding to the physical key may be, for example, an operation location of the physical key on the display screen. This is not specifically limited in this embodiment of this application. Before being written, the operation location of the physical key on the display screen may be subject to coordinate conversion, converted into a corresponding Android value, that is, converted into an operation location under a virtual Android operating system, and then written into the touchscreen device file.

The Android operating system on a mobile phone is usually developed based on a Linux kernel, which may be divided into a kernel layer and an application layer. The application layer may be understood as a running environment of an application (App), and the application may be a game. The kernel layer provides a basic service for the application layer. A driver for various types of hardware is implanted into the kernel layer and is referred to as a hardware driver. The hardware driver may learn data of the hardware by reading and writing a device file of the Android operating system. The hardware driver sends the obtained data of the hardware to an upper-layer application to run the application. In the Android operating system, there are various hardware drivers and corresponding device files, for example, a touchscreen driver, a Bluetooth driver, and an audio driver. Correspondingly, there are touchscreen device files, Bluetooth device files, audio device files, and the like corresponding to the hardware drivers.

For example, the hardware is a touchscreen on a mobile phone. When the touchscreen is touched, screen location coordinates (x, y) generated by touching are used as touch data and transmitted to a touchscreen device file. The touchscreen driver of the kernel layer reads the touchscreen device file, obtains touched touch data of the touchscreen, and then transmits the touch data to the upper-layer application. The upper-layer application of the Android operating system, for example, a game, responds to a message that the touchscreen is touched based on the touch data.

In this embodiment of this application, according to the processing process of the Android operating system, when an Android mobile game is simulated by a PC simulator, when rendering a game frame, the PC simulator obtains screen location coordinates corresponding to a physical key of a keyboard or a mouse by calculating location information of a map picture, and then writes a touchscreen device file to the screen location coordinates corresponding to the physical key as touch data, so that a touch message of the Android operating system may be simulated. That is, the PC simulator simulates a process in which touchscreen hardware write the touchscreen device file.

Therefore, according to this embodiment of this application, a game player presses a physical key on a keyboard in a game playing process, and when detecting that the physical key matches a key icon in a game frame displayed on a display screen, the computing device may consider that the pressing of the physical key on the keyboard is a valid operation. Furthermore, the computing device may search for screen location coordinates (x, y) of a map picture corresponding to a physical key on the display screen, and then write the screen location coordinates into a touchscreen device file.

For example, according to the key position configuration file in the foregoing example, the computing device writes screen location coordinates X=0.656250 and Y=0.419444 corresponding to an F key as touch data into the touchscreen device file.

According to this embodiment of this application, the computing device invokes a touchscreen driver to read operation data written in the touchscreen device file, for example, screen location coordinates, uploads the screen location coordinates to an upper-layer application, generates a message that the display screen is pressed down, and simulates an operation of clicking the display screen under the condition of the touchscreen.

For example, according to the key position configuration file in the foregoing example, after invoking the touchscreen driver to read the screen location coordinates X=0.656250 and Y=0.419444 in the touchscreen device file, the computing device may calculate corresponding screen location coordinates under the Android operating system, and send the corresponding screen location coordinates to the Android operating system through the touchscreen driver, so that it may be learned that the game player presses a GetIntoCar key.

After obtaining the screen location coordinates of the physical key read by the touchscreen driver, the computing device performs a clicking operation at the coordinate point to operate a virtual operation button in a game frame represented by a map picture corresponding to the physical key. Then, the computing device outputs a result after the virtual operation button is clicked on the display screen according to a game logic. For example, according to the key position configuration file in the foregoing example, the computing device clicks a corresponding location on the display screen according to a screen location coordinates under the Android operating system calculated according to the screen location coordinates X=0.656250 and Y=0.419444 to make a character in the game to get on.

According to the virtual scene recognition and interaction key position matching method for an application in this embodiment of this application, an operation location of a physical key corresponding to the preset map picture on a display screen that is inputted by an input/output device under a first operating system is detected, the operation location of the physical key on the display screen is written into a touchscreen device file, the written operation location is read from the touchscreen device file by a touchscreen driver, the operation location is transmitted into the application, and the application performs an interaction operation with the virtual scene at the operation location, so that a user can operate a game by using a keyboard and a mouse.

Figure 11:
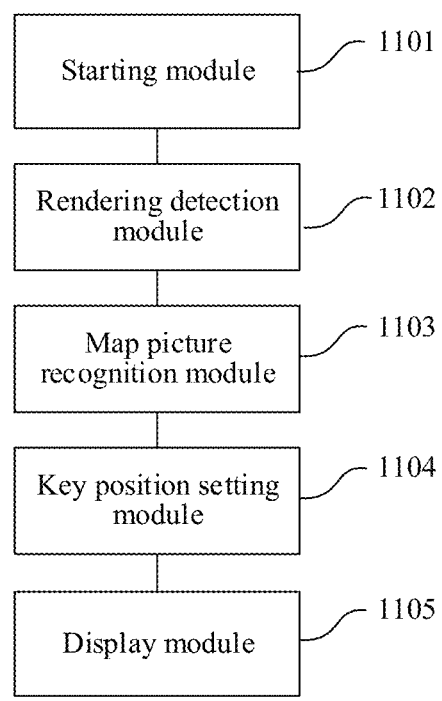
FIG. 11 is a schematic diagram of a virtual scene recognition and interaction key position matching apparatus for an application according to an embodiment of this application.

FIG. 11 is a schematic diagram of a virtual scene recognition and interaction key position matching apparatus for an application according to an embodiment of this application. As shown in FIG. 11, the virtual scene recognition and interaction key position matching apparatus for an application according to this embodiment of this application may include:

a starting module 1101, configured to start an application in a virtual operating system;

a rendering detection module 1102, configured to perform rendering processing on a to-be-presented virtual scene of the application, to obtain rendering data used for rendering the virtual scene;

a map picture recognition module 1103, configured to recognize whether the rendering data includes a preset map picture;

a key position setting module 1104, configured to invoke a corresponding key position configuration file when it is recognized that the rendering data includes the preset map picture, and perform matching processing between the preset map picture and a corresponding physical key of the computing device; and a display module 1105, configured to present the virtual scene and key configuration information corresponding to the virtual scene on a display screen of the computing device, the key configuration information being associated with the matched physical key.

According to this embodiment of this application, the rendering detection module 1102 is configured to obtain, by detecting invocation of a render function by the application, rendering data in a vertex buffer object when the render function is invoked, and use the rendering data in the vertex buffer object as the rendering data used for rendering the virtual scene, the render function being used for performing rendering processing on the virtual scene.

According to this embodiment of this application, an application is started in a virtual operating system, rendering processing is performed on a to-be-presented virtual scene of the application, to obtain rendering data used for rendering the virtual scene, a preset map picture in the rendering data is recognized, a corresponding key position configuration file is invoked when it is recognized that the rendering data includes a preset map picture, to complete matching processing between the map picture and a corresponding physical key of the computing device, and the virtual scene and key configuration information corresponding to the virtual scene are presented on a screen of the computing device. According to this embodiment of this application, a game scene can be quickly and efficiently recognized based on recognition of a map picture in a mobile game application, and game operation keys are automatically and properly distributed in the recognized game scene dynamically in real time, so that the game operation keys are intelligently set. A game player can conveniently use a mouse and a keyboard to experience the game without setting a large quantity of game operation keys, so that the game player can have relatively good game operation experience. Therefore, the key setting manner based on game scene recognition is relatively intelligent and has a better effect.

Figure 12:
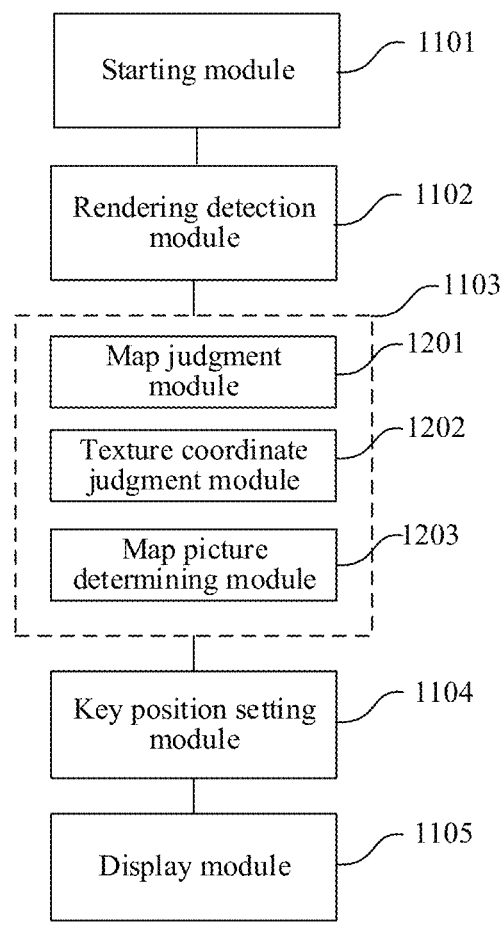
FIG. 12 is a schematic diagram of a map picture recognition module in a virtual scene recognition and interaction key position matching apparatus for an application according to an embodiment of this application.

FIG. 12 is a schematic diagram of a map picture recognition module in a virtual scene recognition and interaction key position matching apparatus for an application according to an embodiment of this application. As shown in FIG. 12, the map picture recognition module 1103 may include:

a map judgment module 1201, configured to determine whether the rendering data includes a preset map in which the preset map picture is located;

a texture coordinate judgment module 1202, configured to determine, when the map judgment module 1201 determines that the rendering data includes the preset map in which the preset map picture is located, that the rendering data includes location information of the preset map picture in the preset map; and a map picture determining module 1203, configured to determine, when the texture coordinate judgment module 1202 determines that the rendering data includes location information of the preset map picture in the preset map, that the rendering data used by the render function includes the preset map picture.

Figure 13:
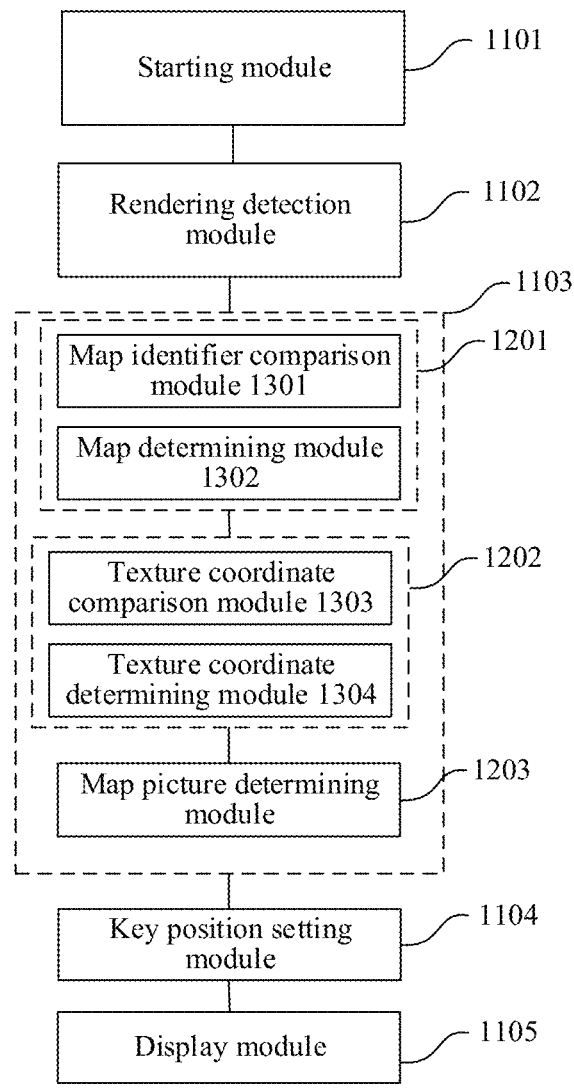
FIG. 13 is a schematic diagram of a map judgment module and a texture coordinate judgment module in a map picture recognition module according to an embodiment of this application.

According to this embodiment of this application, as shown in FIG. 13, the map judgment module 1201 may include: a map identifier comparison module 1301, configured to compare an identifier of a map in the rendering data with a recorded identifier of the preset map; and a map determining module 1302, configured to determine, when the map identifier comparison module 1301 determines that the identifier of the map in the rendering data matches the recorded identifier of the preset map, that the rendering data includes the preset map in which the preset map picture is located.

The texture coordinate judgment module 1202 may include: a texture coordinate comparison module 1303, configured to compare texture coordinates of a map picture in the rendering data with texture coordinates of the preset map picture in the preset map; and a texture coordinate determining module 1304, configured to determine, when the texture coordinate comparison module 1303 determines that the texture coordinates of the map picture in the rendering data match the texture coordinates of the preset map picture in the preset map, that the rendering data includes the location information of the preset map picture in the preset map.

Figure 14:
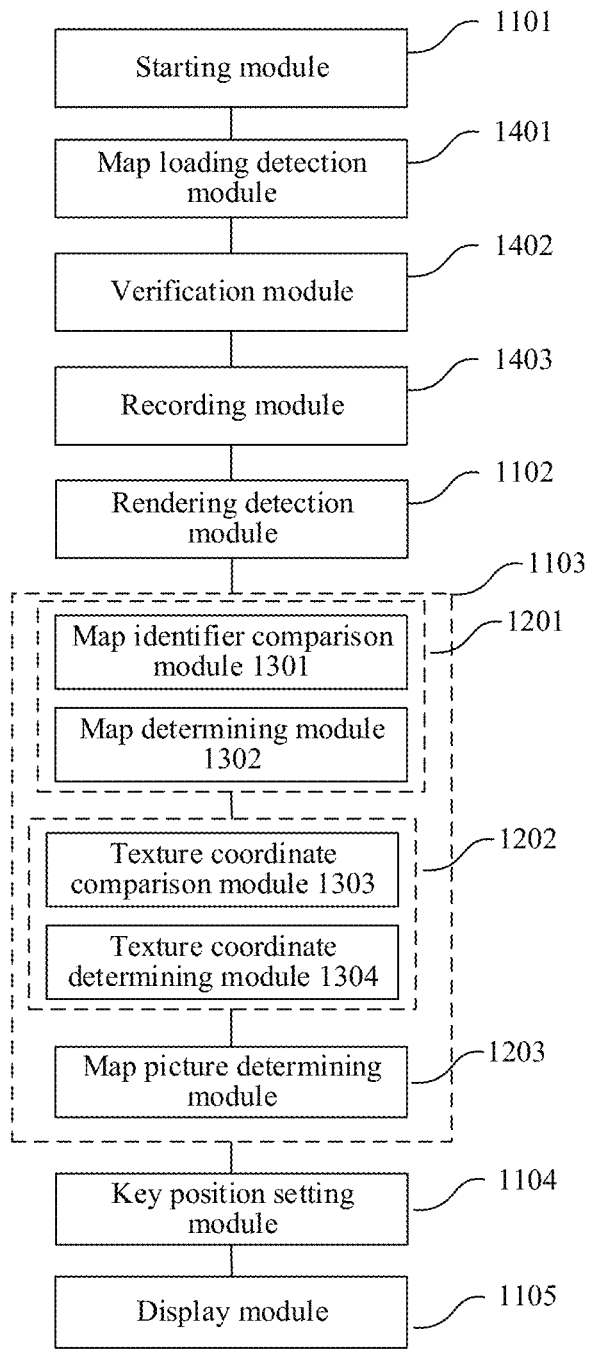
FIG. 14 is a further schematic diagram describing a virtual scene recognition and interaction key position matching apparatus for an application according to an embodiment of this application.

FIG. 14 is a schematic diagram of another virtual scene recognition and interaction key position matching apparatus for an application according to an embodiment of this application. As shown in FIG. 14, based on FIG. 13, the virtual scene recognition and interaction key position matching apparatus for an application further includes the following modules:

a map loading detection module 1401, configured to detect whether a virtual operating system loads application data from a hard disk into an internal memory of a video card;

a verification module 1402, configured to verify a cyclic redundancy check code of a map in the application data after the virtual operating system loads the application data from the hard disk to the internal memory of the video card, and determine whether the cyclic redundancy check code of the map in the application data matches a cyclic redundancy check code of the preset map; and a recording module 1403, configured to record an identifier of the map in the application data when the verification module determines that the cyclic redundancy check code of the map in the application data matches the cyclic redundancy check code of the preset map, and use the identifier of the map in the application data as an identifier of the preset map.

According to the virtual scene recognition and interaction key position matching apparatus for an application in this embodiment of this application, texture coordinates of a map picture in a map in a game are fixed, and for a map picture in the map, texture coordinates of the map picture used during each rendering are the same. Therefore, whether rendering data includes a preset map in which a preset map picture is located is determined by detecting a render function invoked when a game frame is rendered, when it is determined that the rendering data includes the preset map, whether the rendering data includes location information of the preset map picture in the preset map is determined, and when it is determined that the rendering data includes the location information of the preset map picture in the preset map, it is determined that the rendering data used by the render function includes the preset map picture. Whether a map picture needs to be displayed by a game can be quickly learned only through comparison between several coordinate values, and a quantity of processed bytes is relatively small, so that a speed of rendering a game frame by the computing device is higher, required computer resource overheads are fewer, and performance is higher.

Figure 15:
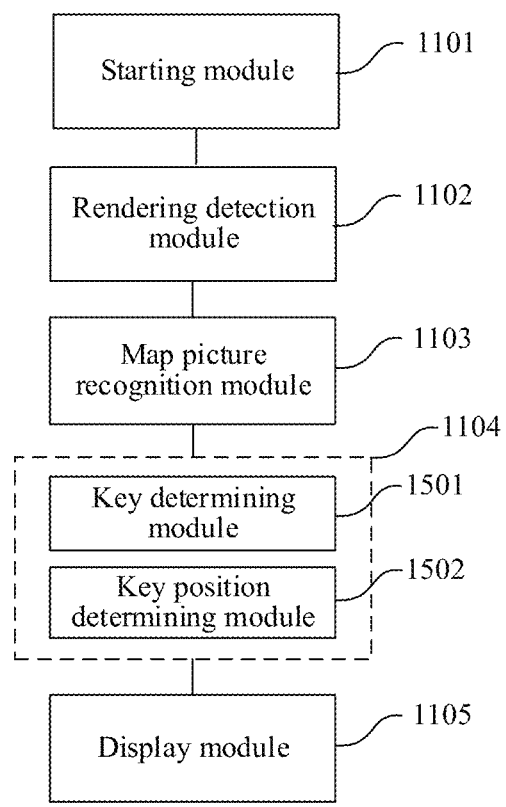
FIG. 15 is a schematic diagram of a key position setting module in a virtual scene recognition and interaction key position matching apparatus for an application according to an embodiment of this application.

FIG. 15 is a schematic diagram of a key position setting module in a virtual scene recognition and interaction key position matching apparatus for an application according to an embodiment of this application. As shown in FIG. 15, the key position setting module 1104 includes:

a key determining module 1501, configured to invoke the corresponding key position configuration file when it is recognized that the rendering data includes the preset map picture, and determine, according to corresponding key information and the preset map picture in the key position configuration file, a physical key corresponding to the preset map picture, to enable the physical key to be valid; and a key position determining module 1502, configured to determine an operation location of the physical key corresponding to the preset map picture on the display screen.

According to the virtual scene recognition and interaction key position matching apparatus for an application of this embodiment of this application, key information corresponding to a preset map picture is searched for in a key position configuration file, a corresponding physical key is determined, and an operation location of the physical key on a display screen is determined, that is, the computing device may dynamically set a corresponding physical key in real time and enable the physical key to be valid, so that a game player may operate a game in real time and has better game operation experience.

For operations of the modules in the apparatus embodiment, refer to specific content described in the foregoing method.

Figure 16:
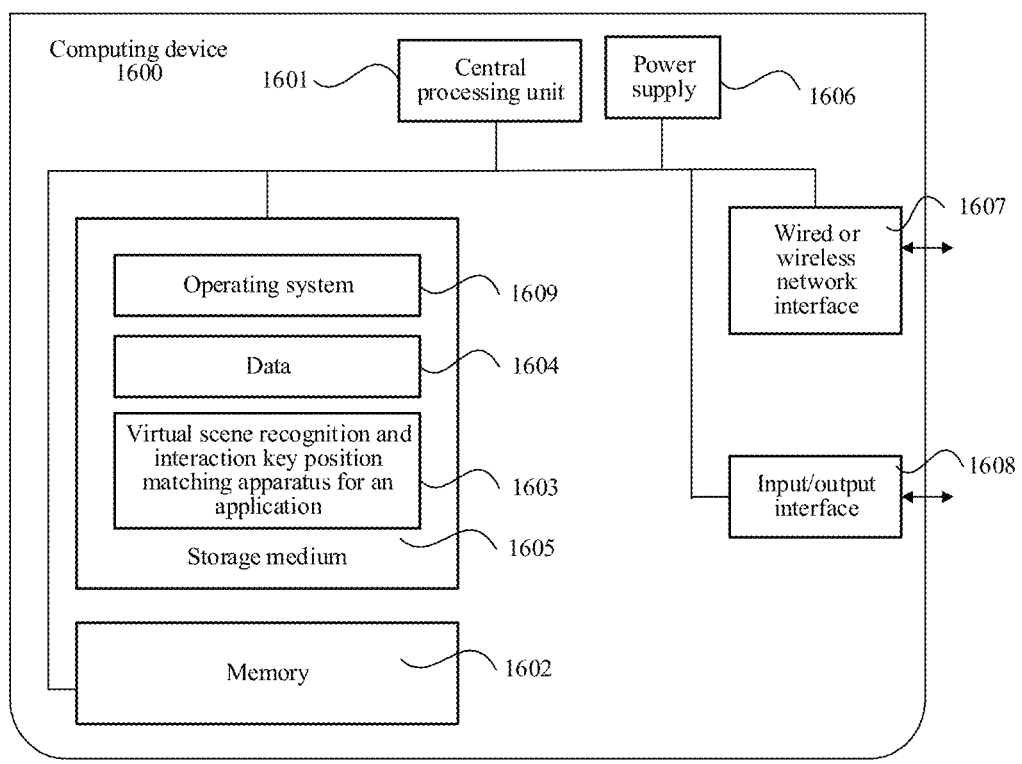
FIG. 16 is a schematic structural diagram of hardware of a computing device in which a virtual scene recognition and interaction key position matching apparatus for an application is located according to an embodiment of this application.

FIG. 16 is a schematic structural diagram of hardware of a computing device according to an embodiment of this application. Referring to FIG. 16, the computing device may have a large difference due to different configuration or performance, and may include one or more central processing units (CPUs) 1601 (for example, one or more processors), a memory 1602, and one or more storage media 1605 (for example, one or more mass storage devices) that store an application program 1603 or data 1604. The memory 1602 and the storage medium 1605 may perform transient storage or permanent storage. The program stored in the storage medium 1605 may include one or more modules (not shown in the figure), and each module may include a series of instruction operations in the computing device. Further, the CPU 1601 may be configured to: communicate with the storage medium 1605, and perform, on the computing device, the series of instruction operations in the storage medium 1605.

Specifically, the application program 1603 stored in the storage medium 1605 includes an application of a virtual scene recognition and interaction key position matching apparatus for an application, and the application may include a starting module 1101, a detection module 1102, a map picture recognition module 1103, a key position setting module 1104, a display module 1105, and an interaction module 1106 in the virtual scene recognition and interaction key position matching apparatus for an application. Details are not described herein. Further, the CPU 1601 may be configured to: communicate with the storage medium 1605, and perform, on the computing device, a series of operations corresponding to a game operation application stored in the storage medium 1605. Alternatively, the game operation application may include the operations described in the method flowcharts.

The computing device may further include one or more power supplies 1606, one or more wired or wireless network interfaces 1607, one or more input/output interfaces 1608, and/or one or more operating systems 1609, for example, Windows Server™, Mac OS X™, Unix™, Linux™, or FreeBSD™.

According to the embodiments of this application, a computing device is provided, capable of constructing or running a virtual operating system and includes: a processor and a memory, the memory storing computer-readable instructions, and the computer-readable instructions being executed by the processor to perform the virtual scene recognition and interaction key position matching method for an application according to the method embodiments According to the computing device in the embodiments of this application, an application is started in a virtual operating system, rendering processing is performed on a to-be-presented virtual scene of the application, to obtain rendering data used for rendering the virtual scene, a preset map picture in the rendering data is recognized, a corresponding key position configuration file is invoked when it is recognized that the virtual scene includes a preset map picture, to complete matching processing between the map picture and a corresponding physical key of the computing device, and the virtual scene and key configuration information corresponding to the virtual scene are presented on a screen of the computing device. According to the embodiments of this application, a game scene can be quickly and efficiently recognized based on recognition of a map picture in a mobile game application, and game operation keys are automatically and properly distributed in the recognized game scene dynamically in real time, so that the game operation keys are intelligently set. A game player can conveniently use a mouse and a keyboard to experience the game without setting a large quantity of game operation keys, so that the game player can have relatively good game operation experience. Therefore, the key setting manner based on game scene recognition is relatively intelligent and has a better effect.

This application is described with reference to the flowcharts and/or block diagrams of the method, the device (system), and the computer program product according to the embodiments of this application. It is to be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable devices, thereby generating computer-implemented processing. Therefore, the instructions executed on the computer or the another programmable device provide steps for implementing a specific function in one or more processes in the flowcharts and/or in one or more blocks in the block diagrams.

In this application, the term "module" or "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. In addition, functional modules in the embodiments of this application may be integrated into one processing unit, or each of the modules may exist alone physically, or two or more modules may be integrated into one unit. The integrated unit may be implemented in a form of hardware, or may be implemented in a form of a software function unit.

In addition, each example of this application may be implemented by a data processing program executed by a data processing device such as a computer. Apparently, data processing programs constitutes this application. In addition, generally the data processing program stored in a storage medium is executed by directly reading the program from the storage medium or by installing or copying the program to a storage device (such as a hard disk or memory) of the data processing device. Therefore, such a storage medium also constitutes this application. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, this application further provides a non-volatile storage medium, which stores a data processing program. The data processing program is used for executing any embodiment of the foregoing method of this application.

The foregoing descriptions are merely exemplary embodiments of this application, but are not intended to limit this application. Any modification, equivalent replacement, or improvement made without departing from the spirit and principle of this application is to fall within the protection scope of this application.

What is claimed is:

1. A virtual scene recognition and interaction key position matching method for an application, performed at a computing device having a first operating system and capable of constructing or running a virtual operating system, the method comprising:
   starting an application in the virtual operating system, wherein the virtual operating system is different from the first operating system of the computing device;
   performing a rendering process on a to-be-presented virtual scene of the application, to obtain rendering data used for rendering the virtual scene;
   in accordance with a determination through virtual scene recognition that the rendering data comprises a preset map picture, invoking a corresponding key position configuration file and performing a matching process between the preset map picture and a corresponding physical key of a mouse or a keyboard of the computing device according to the key position configuration file; and simultaneously presenting the virtual scene and key configuration information corresponding to the virtual scene on a display screen of the computing device, the key configuration information being associated with the matched physical key of the mouse or the keyboard of the computing device, wherein the preset map picture is associated with an action to be performed in the virtual scene.

2. The method according to claim 1, wherein the performing the rendering process on a to-be-presented virtual scene of the application, to obtain rendering data used for rendering the virtual scene comprises:
obtaining, by detecting invocation of a render function by the application, rendering data in a vertex buffer object when the render function is invoked; and
applying the rendering data in the vertex buffer object to the render function as the rendering data used for rendering the virtual scene.

3. The method according to claim 1, further comprising:
in accordance with a determination that the rendering data comprises a preset map in which the preset map picture is located, and that the rendering data comprises location information of the preset map picture in the preset map, determining that the rendering data comprises the preset map picture.

4. The method according to claim 3, further comprising:
comparing an identifier of a map in the rendering data with a recorded identifier of the preset map; and
in accordance with a determination that the identifier of the map in the rendering data matches the recorded identifier of the preset map, determining that the rendering data comprises the preset map.

5. The method according to claim 3, further comprising:
comparing texture coordinates of a map picture in the rendering data with texture coordinates of the preset map picture in the preset map; and
in accordance with a determination that the texture coordinates of the map picture in the rendering data match the texture coordinates of the preset map picture in the preset map, that the rendering data comprises the location information of the preset map picture in the preset map.

6. The method according to claim 4, wherein before the starting an application in the virtual operating system, the method further comprises:
using, after it is detected that the virtual operating system loads application data from a hard disk to an internal memory of a video card and in accordance with a determination that a cyclic redundancy check code of a map in the application data matches a cyclic redundancy check code of the preset map, an identifier of the map in the application data as an identifier of the preset map.

7. The method according to claim 1, wherein the invoking a corresponding key position configuration file and performing the matching process between the preset map picture and a corresponding physical key of the computing device according to the key position configuration file comprises:
invoking the key position configuration file when the rendering data comprises the preset map picture, and determining, according to key information corresponding to the preset map picture in the key position configuration file, a physical key corresponding to the preset map picture, to enable the physical key to be valid; and
determining an operation location of the physical key corresponding to the preset map picture on the display screen.

8. The method according to claim 7, wherein the determining an operation location of the physical key corresponding to the preset map picture on the display screen comprises:
determining, according to the key information corresponding to the preset map picture in the key position configuration file, the operation location of the physical key corresponding to the preset map picture on the display screen; or
determining, according to a display location of the preset map picture on the display screen, the operation location of the physical key corresponding to the preset map picture on the display screen.

9. The method according to claim 8, wherein the determining, according to a display location of the preset map picture on the display screen, the operation location of the physical key corresponding to the preset map picture on the display screen comprises:
searching for vertex coordinates that are to be rendered in the preset map picture in the rendering data;
obtaining a display area of the preset map picture on the display screen according to the vertex coordinates; and
obtaining, according to the display area of the preset map picture on the display screen, the operation location of the physical key corresponding to the preset map picture on the display screen.

10. The method according to claim 1, further comprising:
detecting an operation message that is inputted by an input/output device under a first operating system and that is for the physical key corresponding to the preset map picture; and
writing an operation location of the physical key corresponding to the preset map picture on the display screen into a touchscreen device file, reading, by a touchscreen driver, the operation location from the touchscreen device file, transmitting the operation location to the application, and performing, by the application, an interaction operation with the virtual scene at the operation location on the display screen.

11. A computing device, having a first operating system and capable of constructing or running a virtual operating system, the computing device comprising: a processor and a memory, the memory storing computer-readable instructions, and the computer-readable instructions, when executed by the processor, cause the computing device to perform a plurality of operations including:
starting an application in the virtual operating system, wherein the virtual operating system is different from the first operating system of the computing device;
performing a rendering process on a to-be-presented virtual scene of the application, to obtain rendering data used for rendering the virtual scene;
in accordance with a determination through virtual scene recognition that the rendering data comprises a preset map picture, invoking a corresponding key position configuration file and performing a matching process between the preset map picture and a corresponding physical key of a mouse or a keyboard of the computing device according to the key position configuration file; and
simultaneously presenting the virtual scene and key configuration information corresponding to the virtual scene on a display screen of the computing device, the key configuration information being associated with the matched physical key of the mouse or the keyboard of the computing device, wherein the preset map picture is associated with an action to be performed in the virtual scene.

12. The computing device according to claim 11, wherein the performing the rendering process on a to-be-presented virtual scene of the application, to obtain rendering data used for rendering the virtual scene comprises:
obtaining, by detecting invocation of a render function by the application, rendering data in a vertex buffer object when the render function is invoked; and
applying the rendering data in the vertex buffer object to the render function as the rendering data used for rendering the virtual scene.

13. The computing device according to claim 11, wherein the plurality of operations further comprise:
in accordance with a determination that the rendering data comprises a preset map in which the preset map picture is located, and that the rendering data comprises location information of the preset map picture in the preset map, determining that the rendering data comprises the preset map picture.

14. The computing device according to claim 13, wherein the plurality of operations further comprise:
comparing an identifier of a map in the rendering data with a recorded identifier of the preset map; and
in accordance with a determination that the identifier of the map in the rendering data matches the recorded identifier of the preset map, determining that the rendering data comprises the preset map.

15. The computing device according to claim 13, wherein the plurality of operations further comprise:
comparing texture coordinates of a map picture in the rendering data with texture coordinates of the preset map picture in the preset map; and
in accordance with a determination that the texture coordinates of the map picture in the rendering data match the texture coordinates of the preset map picture in the preset map, that the rendering data comprises the location information of the preset map picture in the preset map.

16. The computing device according to claim 14, wherein the plurality of operations further comprise:
using, after it is detected that the virtual operating system loads application data from a hard disk to an internal memory of a video card and in accordance with a determination that a cyclic redundancy check code of a map in the application data matches a cyclic redundancy check code of the preset map, an identifier of the map in the application data as an identifier of the preset map.

17. The computing device according to claim 11, wherein the invoking a corresponding key position configuration file and performing the matching process between the preset map picture and a corresponding physical key of the computing device according to the key position configuration file comprises:
invoking the key position configuration file when the rendering data comprises the preset map picture, and determining, according to key information corresponding to the preset map picture in the key position configuration file, a physical key corresponding to the preset map picture, to enable the physical key to be valid; and
determining an operation location of the physical key corresponding to the preset map picture on the display screen.

18. The computing device according to claim 17, wherein the determining an operation location of the physical key corresponding to the preset map picture on the display screen comprises:
determining, according to the key information corresponding to the preset map picture in the key position configuration file, the operation location of the physical key corresponding to the preset map picture on the display screen; or
determining, according to a display location of the preset map picture on the display screen, the operation location of the physical key corresponding to the preset map picture on the display screen.

19. The computing device according to claim 11, wherein the plurality of operations further comprise:
detecting an operation message that is inputted by an input/output device under a first operating system and that is for the physical key corresponding to the preset map picture; and
writing an operation location of the physical key corresponding to the preset map picture on the display screen into a touchscreen device file, reading, by a touchscreen driver, the operation location from the touchscreen device file, transmitting the operation location to the application, and performing, by the application, an interaction operation with the virtual scene at the operation location on the display screen.

20. A non-transitory computer-readable storage medium, storing a plurality of instructions, the instructions, when executed by a processor of a computing device having a first operating system, causing the computing device to perform a plurality of operations including:
starting an application in the virtual operating system, wherein the virtual operating system is different from the first operating system of the computing device;
performing a rendering process on a to-be-presented virtual scene of the application, to obtain rendering data used for rendering the virtual scene;
in accordance with a determination through virtual scene recognition that the rendering data comprises a preset map picture, invoking a corresponding key position configuration file and performing a matching process between the preset map picture and a corresponding physical key of a mouse or a keyboard of the computing device according to the key position configuration file; and
simultaneously presenting the virtual scene and key configuration information corresponding to the virtual scene on a display screen of the computing device, the key configuration information being associated with the matched physical key of the mouse or the keyboard of the computing device, wherein the preset map picture is associated with an action to be performed in the virtual scene.

* * * * *